(12) United States Patent
Babayan et al.

(10) Patent No.: US 12,554,478 B2
(45) Date of Patent: Feb. 17, 2026

(54) SYSTEMS AND METHODS FOR SIMULATING OVER-THE-AIR SOFTWARE UPDATES FOR VEHICLES

(71) Applicant: Mercedes-Benz Group AG, Stuttgart (DE)

(72) Inventors: Movses Babayan, Monroe, WA (US); James Shimada, Seattle, WA (US); Leena Singhal, Bothell, WA (US); Mike Qin, Issaquah, WA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 185 days.

(21) Appl. No.: 18/353,587

(22) Filed: Jul. 17, 2023

(65) Prior Publication Data
US 2024/0394036 A1    Nov. 28, 2024

Related U.S. Application Data

(60) Provisional application No. 63/503,609, filed on May 22, 2023.

(51) Int. Cl.
*G06F 9/44*  (2018.01)
*G06F 8/65*  (2018.01)
(Continued)

(52) U.S. Cl.
CPC ............... *G06F 8/65* (2013.01); *H04L 67/12* (2013.01); *H04L 67/34* (2013.01)

(58) Field of Classification Search
CPC ........................................................ G06F 8/65
(Continued)

(56) References Cited

U.S. PATENT DOCUMENTS

| 7,058,558 B2 * | 6/2006 | Reichenthal | ............ G06F 30/20 |
| | | | 715/234 |
| 10,871,952 B2 * | 12/2020 | Wang | .................... H04L 63/061 |

(Continued)

FOREIGN PATENT DOCUMENTS

| CA | 3056243 A1 | 3/2021 |
| CN | 115220749 A | 10/2022 |

(Continued)

OTHER PUBLICATIONS

International Search Report with Written Opinion of the International Searching Authority for the Application No. PCT/EP2024/057309 mailed Jun. 14, 2024.

*Primary Examiner* — Evral E Bodden
(74) *Attorney, Agent, or Firm* — Dority & Manning, P.A.

(57) ABSTRACT

Methods, computing systems, and technology for testing an update controller within a virtual environment are presented. An example computing system accesses data indicative of a rule for distributing the over-the-air (OTA) software update. The computing system determines an action to be taken for implementing the OTA software update. The action is based on the rule for distributing the OTA software update and a mocked behavior of an external software service available to the update controller. The mocked behavior simulates a response of the external software service to a request from the update controller within the isolated virtual environment. The computing system accesses data indicating that a vehicle simulator is available for the OTA software update. The computing system generates a task package including the OTA software update and indicating the action to be taken for implementing the OTA software update. The computing system outputs the task package to the vehicle simulator.

20 Claims, 10 Drawing Sheets

(51) Int. Cl.
*H04L 67/00* (2022.01)
*H04L 67/12* (2022.01)

(58) Field of Classification Search
USPC .......................................................... 717/172
See application file for complete search history.

(56) References Cited

U.S. PATENT DOCUMENTS

| | | |
|---|---|---|
| 11,436,484 B2 | 9/2022 | Farabet et al. |
| 11,914,987 B2 * | 2/2024 | Acharya ................. H04L 67/34 |
| 2010/0153088 A1 * | 6/2010 | Kim .......................... G06F 8/65 |
| | | 703/22 |
| 2017/0171029 A1 | 6/2017 | Maknojia et al. |
| 2020/0226225 A1 * | 7/2020 | Zaytsev ................. G01M 17/00 |

FOREIGN PATENT DOCUMENTS

| | | |
|---|---|---|
| DE | 10 2017 208 986 A1 | 11/2018 |
| KR | 20230010542 A | 1/2023 |

* cited by examiner

SYSTEMS AND METHODS FOR SIMULATING OVER-THE-AIR SOFTWARE UPDATES FOR VEHICLES

PRIORITY CLAIM

The present application is based on and claims priority to U.S. Provisional Application No. 63/503,609 having a filing date of May 22, 2023, which is incorporated by reference herein in its entirety.

FIELD

The present disclosure relates generally to simulating, within a virtual environment, the performance of a controller that is configured to perform over-the-air (OTA) software updates for vehicles.

BACKGROUND

Over-the-air (OTA) updates include the process of wirelessly updating the software of a device, such as a smartphone, Internet of Things (IoT) device, or vehicle. OTA updates allow manufacturers to push updates and patches to devices remotely, without requiring users to connect their device or manually install the updates. OTA updates are commonly used for fixing software bugs, improving device performance, adding new features, and addressing security vulnerabilities. OTA updates have become increasingly common in recent years as more devices are connected to the internet, making it easier for manufacturers to deliver updates quickly and efficiently.

SUMMARY

Aspects and advantages of implementations of the present disclosure will be set forth in part in the following description, or may be learned from the description, or may be learned through practice of the implementations.

One example aspect of the present disclosure is directed to a computing system. The computing system includes a control circuit configured to test, within an isolated virtual environment, an update controller for distributing an over-the-air (OTA) software update. The control circuit is configured to access data indicative of a rule for distributing the OTA software update. The control circuit is configured to determine an action to be taken for implementing the OTA software update. The action is based on the rule for distributing the OTA software update and a mocked behavior of an external software service available to the update controller. The mocked behavior simulates a response of the external software service to a request from the update controller within the isolated virtual environment. The control circuit is configured to access data indicating that a vehicle simulator is available for the OTA software update. The control circuit is configured to generate, for the vehicle simulator, a task package including the OTA software update and indicating the action to be taken for implementing the OTA software update. The control circuit is configured to output the task package to the vehicle simulator within the isolated virtual environment.

In an embodiment, the control circuit is further configured to provision the isolated virtual environment including a simulated instance of the update controller, wherein the simulated instance of the update controller includes a simulated administration service and a simulated vehicle service.

In an embodiment, to provision the isolated virtual environment, the control circuit is configured to provision, within the isolated virtual environment, the vehicle simulator, a simulated consumer service, and a proxy for facilitating mocked behaviors of a plurality of external software services.

In an embodiment, the rule for distributing the OTA software update is provided by the simulated consumer service.

In an embodiment, the simulated consumer service is configured to send a communication to the vehicle simulator to trigger the vehicle simulator to provide the data indicating that the vehicle simulator is available for the OTA software update.

In an embodiment, the mocked behaviors are registered with the proxy prior to running a simulation test of the update controller.

In an embodiment, the mocked behavior is based on a behavior of the external software service in a live environment.

In an embodiment, the mocked behavior is based on log data generated during communication between the update controller and the external software service in the live computing environment. The log data includes a request parameter associated with the update controller, a response payload provided by the external software service, and a response time indicating a duration of time until the external software service responded to the update controller.

In an embodiment, the log data is processed to determine a predicted behavior of the external software service, and the mocked behavior is based on the predicted behavior of the external software service.

In an embodiment, the control circuit is further configured to access, based on the mocked behavior of the external software service, information to assist the vehicle simulator to implement the OTA software update. The task package includes the information to assist the vehicle simulator to implement the OTA software update.

In an embodiment, the external software service is a vehicle configuration service and the information to assist the vehicle simulator to implement the OTA software update includes vehicle configuration data for a vehicle component associated with the OTA software update.

In an embodiment, the control circuit utilizes cloud-based computing platform infrastructure.

In an embodiment, the isolated virtual environment is a first isolated virtual environment, and wherein the control circuit is configured to provision a second isolated virtual environment that is separate from the first isolated virtual environment and includes a simulated instance of the update controller separate from the first isolated virtual environment.

In an embodiment, the control circuit is further configured to remove the isolated virtual environment.

Another example aspect of the present disclosure is directed to a computer-implemented method for testing, within an isolated virtual environment, an update controller for distributing an over-the-air (OTA) software update. The method includes accessing data indicative of a rule for distributing the OTA software update. The method includes determining an action to be taken for implementing the OTA software update. The action is based on the rule for distributing the OTA software update and a mocked behavior of an external software service available to the update controller. The mocked behavior simulates a response of the external software service to a request from the update controller within the isolated virtual environment. The method includes accessing data indicating that a vehicle simulator is available for the OTA software update. The method includes generating, for the vehicle simulator, a task package including the OTA software update and indicating the action to be taken for implementing the OTA software update. The method includes outputting the task package to the vehicle simulator within the isolated virtual environment.

In an embodiment, the method further includes provisioning the isolated virtual environment comprising a simulated instance of the update controller.

In an embodiment, the method further includes accessing, based on the mocked behavior of the external software service, information to assist the vehicle simulator to implement the OTA software update. The task package includes the information to assist the vehicle simulator to implement the OTA software update.

In an embodiment, the isolated virtual environment is a first isolated virtual environment, and the method further includes provisioning a second isolated virtual environment that is separate from the first isolated virtual environment.

In an embodiment, the method further includes removing the isolated virtual environment.

Yet another example aspect of the present disclosure is directed to one or more non-transitory computer-readable media that store instructions that are executable by a control circuit configured to test, within an isolated virtual environment, an update controller for distributing an over-the-air (OTA) software update. The control circuit is configured to access data indicative of a rule for distributing the OTA software update. The control circuit is configured to determine an action to be taken for implementing the OTA software update. The action is based on the rule for distributing the OTA software update and a mocked behavior of an external software service available to the update controller. The mocked behavior simulates a response of the external software service to a request from the update controller within the isolated virtual environment. The control circuit is configured to access data indicating that a vehicle simulator is available for the OTA software update. The control circuit is configured to generate, for the vehicle simulator, a task package including the OTA software update and indicating the action to be taken for implementing the OTA software update. The control circuit is configured to output the task package to the vehicle simulator within the isolated virtual environment.

Other example aspects of the present disclosure are directed to other systems, methods, vehicles, apparatuses, tangible non-transitory computer-readable media, and devices for the technology described herein.

These and other features, aspects, and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which.

DETAILED DESCRIPTION

Figure 1:
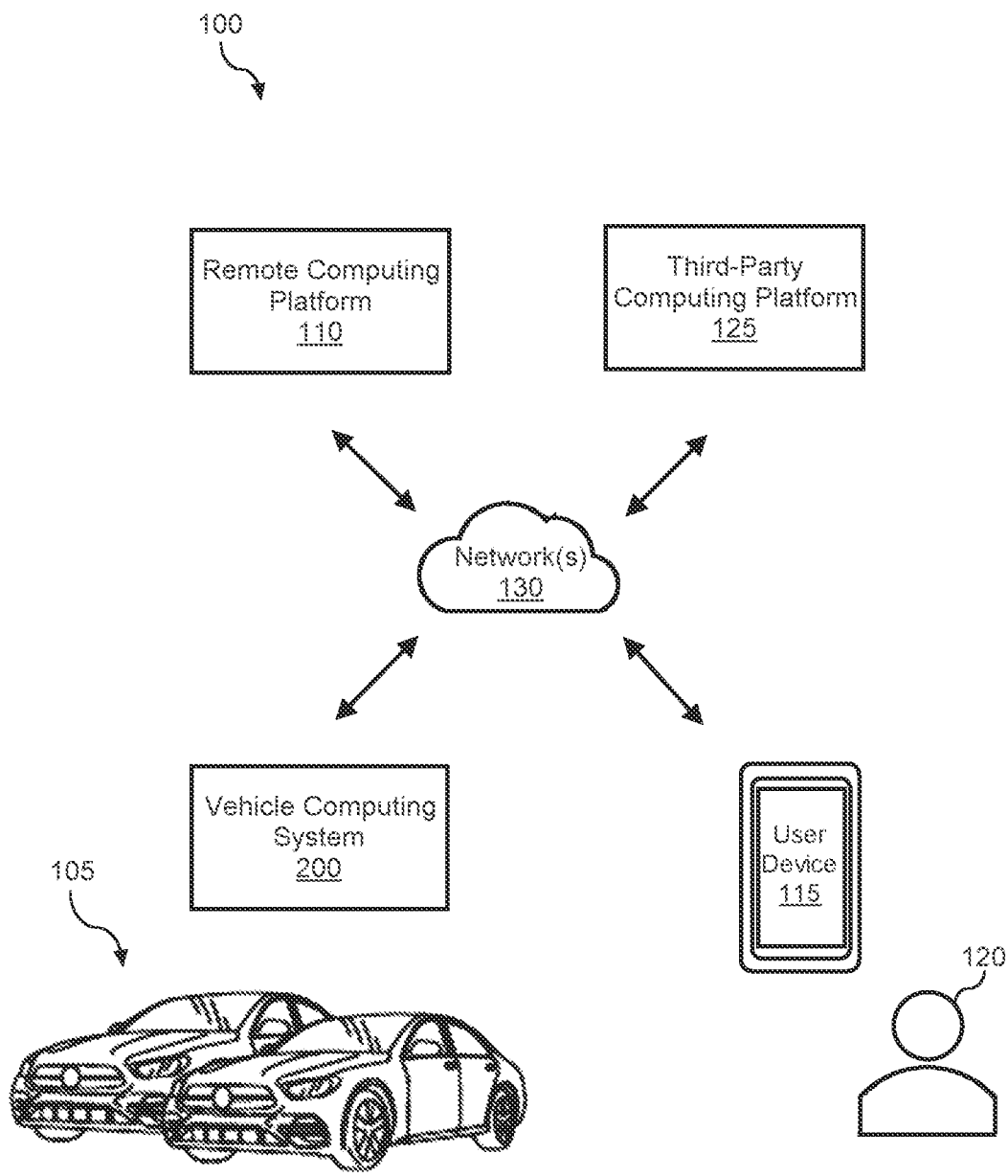
FIG. 1 illustrates an example computing ecosystem according to an embodiment hereof.

An aspect of the present disclosure relates to simulating, within an isolated virtual environment, the performance of a controller that is configured to perform over-the-air (OTA) software updates for vehicles. Many different systems may be involved in the provision of an OTA software update (also referred to herein as an "OTA update"). For example, as a distributed IoT ecosystem, an OTA computing environment may include of a number of heterogenous systems connected over one or more networks, including the on-vehicle systems and platform systems (e.g., cloud-based systems) that communicate with each other to fulfill OTA software updates from end to end for vehicles. An example platform-based system that may help facilitate the distribution of OTA updates is an update controller system (also referred to herein as "update controller").

An update controller may function as the point of contact for the on-vehicle systems as well as the orchestrator of OTA update workflows. For example, the update controller may obtain a rule for distributing an OTA update such as, "all 2021 models are to upgrade to infotainment platform version 1.6." The update controller may communicate with one or more back-end services (or "external dependencies") from which the update controller can obtain information for a vehicle, subject to the rule, to properly implement the OTA update. The update controller may package the collected information for the subject vehicle such that the vehicle's onboard computing system can take the appropriate action to implement the OTA update.

The update controller may be part of an ecosystem of a number of disparate systems that work together in a coordinated fashion in order to fulfill requests for OTA software updates, across a variety of use cases having varying levels of complexity. This may create a challenge in testing these use cases from end to end. For example, it may be helpful to test software changes made to the update controller end to end before updating the live environment where actual consumer systems and vehicles could be adversely affected (e.g., by latency, etc.) due to software issues.

Traditionally, this may be dealt with by having a one or more additional full environments of the entire software chain for the purposes of integration and testing. But this solution has shortcomings, particularly when it comes to integration with external dependencies. Since the systems in these environments may be separately owned and operated, they may rely on common and well-known environments such as "DEV" and "INTEGRATION." However, the nature of some simulations may benefit from even more test environments. Moreover, issues with data consistency may arise when, for example, several instances of update controller environments depend on the same vehicle configuration service instance. Additionally, while it may be helpful to load test the update controller, this may overwhelm dependencies in a non-production environment that is not necessarily scaled for peak traffic.

To help address these issues, the technology of the present disclosure provides for an isolated virtual environment for the update controller. The virtual environment may allow tests to be run such that they do not affect actual external dependencies or vehicles. For instance, the virtual environment may include a fully functioning instance of the update controller, with dedicated underlying cloud infrastructure components. The virtual environment can exist in isolation (e.g., from a network perspective) from an actual environment. The technology of the present disclosure allows for a plurality of these virtual environments to be provisioned concurrently and operated concurrently (e.g., on the cloud) without any conflict.

The virtual environment may include other components that are provisioned for the purposes of testing the update controller. For example, in the virtual environment, the vehicle can be replaced by a software-based vehicle simulator, consumer systems can be impersonated by integration tests (which in turn may also control the vehicle simulator), and external dependencies can be mocked with explicit, contrived behaviors.

The technology of the present disclosure can provide a number of technical effects and computing improvements through its ability to mock external dependencies with contrived behaviors. For instance, instead of deploying individual mocked instances of all the external dependencies, a single proxy may be used by the update controller within the virtual environment for multiple (e.g., all) external dependencies. From the update controller's perspective, it may only be aware that it is calling a particular service with a given request, and expecting some response in a given schema. For example, the update controller (e.g., its simulated instance) may not know how the call is routed to a particular service or who is actually responding. In the virtual environment, the integration tests can set up the mocks necessary to exercise a given set of test cases. The integration tests can define the behavior of the external service using a full-featured mocking framework. This approach can keep the definition of expected behavior of the external service localized to the tests that are triggering it.

Having the integration tests explicitly specifying the behavior of the external dependency can provide a distinct advantage over using the real external dependency in an integration environment. For example, this can allow for testing edge cases and sporadic errors that are difficult to reproduce. Using a mocking framework makes it computationally more efficient to specify a behavior. This way, a virtual environment can be used to reliably test certain error cases with external dependencies.

In some implementations, techniques can be utilized to prevent mock behaviors from drifting too far from their real-world corollaries. For example, a mocked behavior may drift from the actual behavior of the external dependency. In the event the drift is too great, tests may become less reliable indicators that certain code will work in the real world. To address this situation, as will be further described herein, the technology of the present disclosure may use data collected from calling a given external service in the real world to inform a model governing how the external service responds in the virtual environment (e.g., as represented by its mocked behavior).

Furthermore, the technology of the present disclosure allows a virtual environment to be considered "zero-click" because it is designed to be dynamically provisioned, tested, and removed (e.g., torn down, deleted, etc.) through automated Continuous Integration/Continuous Delivery (CI/CD) pipelines. By integrating the provisioning, testing, and removal (e.g., tearing down) of the virtual environment in a modern CI/CD pipeline system, a great deal of flexibility can be achieved in running end-to-end integration tests early in the software development lifecycle.

Using the traditional method where integration with external systems is tested end to end on a dedicated shared environment, a developer would have to merge their code changes to the repository, build and deploy to the shared integration environment, then run end to end tests. This creates a long cycle between coding and integration testing, with a lot of idle time spent waiting for builds and deployments to complete. By contrast, with an isolated virtual environment and supporting CI/CD pipelines of the present disclosure, it is more efficient and easier to perform integration testing before code is even merged to the repository. This can be accomplished by invoking provision/execute/destroy pipelines within a pull request pipeline, which in turn can be triggered when a request is made to merge code into the repository. In the pull request pipeline, the branch requested to be pulled can be built, deployed to the virtual environment, and tested by invoking the three virtual environment pipelines. In some implementations, integration test failures can be used as a gate to prevent completion of the pull request, preventing code having integration issues from being committed to the repository in the first place.

Ultimately, the technology of the present disclosure provides for an improvement in vehicle (or other end user device) computing technology. By way of example, a computing system may be configured to test, within an isolated virtual environment, an update controller for distributing an over-the-air (OTA) software update. Within the virtual environment, the computing system may provision a simulated instance of the update controller. The update controller may access data indicative of a rule for distributing the OTA software update. The update controller may determine an action to be taken for implementing the OTA software update. The action may indicate one or more operations that a vehicle is to take to properly download and implement the OTA software update into its onboard computing system. The action may be based on the rule for distributing the OTA software update and a mocked behavior of an external software service available to the update controller. The mocked behavior may simulate a response of the external software service to a request from the update controller within the isolated virtual environment. The update controller may access data indicating that a vehicle simulator is available for the OTA software update. The update controller may generate, for the vehicle simulator, a task package including the OTA software update and indicating the action to be taken for implementing the OTA software update. The update controller may output the task package to the vehicle simulator within the isolated virtual environment.

In this way, an update controller may be tested and validated in a simulated environment prior to deployment in an actual, live environment. Having the vehicle simulator and the mocked back-end dependencies of the update controller all in a single isolated virtual environment, that doesn't need to contact outside world, leads to more stable and predictable tests because more readily avoids disruptions to the simulation functions. Moreover, the simulation can improve the validity and reliability of the update controller. This can improve the reliability of distributing OTA software updates for vehicles and avoid wasting computing resources on distributions that may end up with implementation errors. Ultimately, this can improve vehicle functionality and performance because the vehicles' onboard software can be updated more efficiently and effectively.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations may be made to the embodiments without departing from the scope or spirit of the present disclosure. For instance, features illustrated or described as part of one embodiment may be used with another embodiment to yield a still further embodiment. Thus, it is intended that aspects of the present disclosure cover such modifications and variations.

The technology of the present disclosure may include the collection of data associated with a user in the event that the user expressly authorizes such collection. Such authorization may be provided by the user via explicit user input to a user interface in response to a prompt that expressly requests such authorization. Collected data may be anonymized, pseudonymized, encrypted, noised, securely stored, or otherwise protected. A user may opt out of such data collection at any time.

The following description describes over-the-air (OTA) software update related technology within the context of vehicles for example purposes. The technology described herein may be utilized in other Internet of Things (IoT) contexts and environments. For example, computing devices and device simulators may be used instead of vehicles and vehicle simulators.

FIG. 1 illustrates an example computing ecosystem 100 according to an embodiment hereof. The ecosystem 100 may include a vehicle 105, a remote computing platform 110 (also referred to herein as computing platform 110), and a user device 115 associated with a user 120. The user 120 may be a driver of the vehicle. In some implementations, the user 120 may be a passenger of the vehicle. In some implementations, the computing ecosystem 100 may include a third party (3P) computing platform 125, as further described herein. The vehicle 105 may include a vehicle computing system 200 located onboard the vehicle 105. The computing platform 110, the user device 115, the third party computing platform 125, and/or the vehicle computing system 200 may be configured to communicate with one another via one or more networks 130.

The systems/devices of ecosystem 100 may communicate using one or more application programming interfaces (APIs). This may include external facing APIs to communicate data from one system/device to another. The external facing APIs may allow the systems/devices to establish secure communication channels via secure access channels over the networks 130 through any number of methods, such as web-based forms, programmatic access via RESTful APIs, Simple Object Access Protocol (SOAP), remote procedure call (RPC), scripting access, etc.

The computing platform 110 may include a computing system that is remote from the vehicle 105. In an embodiment, the computing platform 110 may include a cloud-based server system. The computing platform 110 may be associated with (e.g., operated by) an entity. For example, the remote computing platform 110 may be associated with an Original Equipment Manufacturer (OEM) that is responsible for the make and model of the vehicle 105. In another example, the remote computing platform 110 may be associated with a service entity contracted by the OEM to operate a cloud-based server system that provides computing services to the vehicle 105.

The computing platform 110 may include one or more back-end services for supporting the vehicle 105. The services may include, for example, tele-assist services, navigation/routing services, performance monitoring services, etc. The computing platform 110 may host or otherwise include one or more APIs for communicating data to/from a computing system 130 of the vehicle 105 or the user device 115.

The computing platform 110 may include one or more computing devices. For instance, the computing platform 110 may include a control circuit and a non-transitory computer-readable medium (e.g., memory). The control circuit of the computing platform 110 may be configured to perform the various operations and functions described herein. Further description of the computing hardware and components of computing platform 110 is provided herein with reference to other figures.

The user device 115 may include a computing device owned or otherwise accessible to the user 120. For instance, the user device 115 may include a phone, laptop, tablet, wearable device (e.g., smart watch, smart glasses, headphones), personal digital assistant, gaming system, personal desktop devices, other hand-held devices, or other types of mobile or non-mobile user devices. As further described herein, the user device 115 may include one or more input components such as buttons, a touch screen, a joystick or other cursor control, a stylus, a microphone, a camera or other imaging device, a motion sensor, etc. The user device 115 may include one or more output components such as a display device (e.g., display screen), a speaker, etc. In an embodiment, the user device 115 may include a component such as, for example, a touchscreen, configured to perform input and output functionality to receive user input and present information for the user 120. The user device 115 may execute one or more instructions to run an instance of a software application and present user interfaces associated therewith, as further described herein. In an embodiment, the launch of a software application may initiate a user-network session with the computing platform 110.

The third-party computing platform 125 may include a computing system that is remote from the vehicle 105, remote computing platform 110, and user device 115. In an embodiment, the third-party computing platform 125 may include a cloud-based server system. The term "third-party entity" may be used to refer to an entity that is different than the entity associated with the remote computing platform 110. For example, as described herein, the remote computing platform 110 may be associated with an OEM that is responsible for the make and model of the vehicle 105. The third-party computing platform 125 may be associated with a supplier of the OEM, a maintenance provider, a mapping service provider, an emergency provider, or other types of entities. In another example, the third-party computing platform 125 may be associated with an entity that owns, operates, manages, etc. a software application that is available to or downloaded on the vehicle computing system 200.

The third-party computing platform 125 may include one or more back-end services provided by a third-party entity. The third-party computing platform 125 may provide services that are accessible by the other systems and devices of the ecosystem 100. The services may include, for example, mapping services, routing services, search engine functionality, maintenance services, entertainment services (e.g., music, video, images, gaming, graphics), emergency services (e.g., roadside assistance, 911 support), or other types of services. The third-party computing platform 125 may host or otherwise include one or more APIs for communicating data to/from the third-party computing system 125 to other systems/devices of the ecosystem 100.

The networks 130 may be any type of network or combination of networks that allows for communication between devices. In some implementations, the networks 130 may include one or more of a local area network, wide area network, the Internet, secure network, cellular network, mesh network, peer-to-peer communication link or some combination thereof and may include any number of wired or wireless links. Communication over the networks 130 may be accomplished, for instance, via a network interface using any type of protocol, protection scheme, encoding, format, packaging, etc. In an embodiment, communication between the vehicle computing system 200 and the user device 115 may be facilitated by near field or short range communication techniques (e.g., Bluetooth low energy protocol, radio frequency signaling, NFC protocol).

The vehicle 105 may be a vehicle that is operable by the user 120. In an embodiment, the vehicle 105 may be an automobile or another type of ground-based vehicle that is manually driven by the user 120. For example, the vehicle 105 may be a Mercedes-Benz® car or van. In some implementations, the vehicle 105 may be an aerial vehicle (e.g., a personal airplane) or a water-based vehicle (e.g., a boat). The vehicle 105 may include operator-assistance functionality such as cruise control, advanced driver assistance systems, etc. In some implementations, the vehicle 105 may be a fully or semi-autonomous vehicle.

The vehicle 105 may include a powertrain and one or more power sources. The powertrain may include a motor (e.g., an internal combustion engine, electric motor, or hybrid thereof), e-motor (e.g., electric motor), transmission (e.g., automatic, manual, continuously variable), driveshaft, axles, differential, e-components, gear, etc. The power sources may include one or more types of power sources. For example, the vehicle 105 may be a fully electric vehicle (EV) that is capable of operating a powertrain of the vehicle 105 (e.g., for propulsion) and the vehicle's onboard functions using electric batteries. In an embodiment, the vehicle 105 may use combustible fuel. In an embodiment, the vehicle 105 may include hybrid power sources such as, for example, a combination of combustible fuel and electricity.

The vehicle 105 may include a vehicle interior. The vehicle interior may include the area inside of the body of the vehicle 105 including, for example, a cabin for users of the vehicle 105. The interior of the vehicle 105 may include seats for the users, a steering mechanism, accelerator interface, braking interface, etc. The interior of the vehicle 105 may include a display device such as a display screen associated with an infotainment system, as further described with respect to FIG. 3.

The vehicle 105 may include a vehicle exterior. The vehicle exterior may include the outer surface of the vehicle 105. The vehicle exterior may include one or more lighting elements (e.g., headlights, brake lights, accent lights). The vehicle 105 may include one or more doors for accessing the vehicle interior by, for example, manipulating a door handle of the vehicle exterior. The vehicle 105 may include one or more windows, including a windshield, door windows, passenger windows, rear windows, sunroof, etc.

The systems and components of the vehicle 105 may be configured to communicate via a communication channel. The communication channel may include one or more data buses (e.g., controller area network (CAN)), on-board diagnostics connector (e.g., OBD-II), or a combination of wired or wireless communication links. The onboard systems may send or receive data, messages, signals, etc. amongst one another via the communication channel.

In an embodiment, the communication channel may include a direct connection, such as a connection provided via a dedicated wired communication interface, such as a Recommended Standard 232 (RS-232 interface), a universal serial bus (USB) interface, or via a local computer bus, such as a peripheral component interconnect (PCI) bus. In an embodiment, the communication channel may be provided via a network. The network may be any type or form of network, such as a personal area network (PAN), a local-area network (LAN), Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the systems/devices of the vehicle 105 may communicate via an intermediate storage device, or more generally an intermediate non-transitory computer-readable medium. For example, the non-transitory computer-readable medium 140, which may be external to the computing system 130, may act as an external buffer or repository for storing information. In such an example, the computing system 130 may retrieve or otherwise receive the information from the non-transitory computer-readable medium 140.

Certain routine and conventional components of vehicle 105 (e.g., an engine) are not illustrated and/or discussed herein for the purpose of brevity. One of ordinary skill in the art will understand the operation of conventional vehicle components in vehicle 105.

The vehicle 105 may include a vehicle computing system 200. As described herein, the vehicle computing system 200 that is onboard the vehicle 105. For example, the computing devices and components of the vehicle computing system 200 may be housed, located, or otherwise included on or within the vehicle 105. The vehicle computing system 200 may be configured to execute the computing functions and operations of the vehicle 105.

Figure 2A:
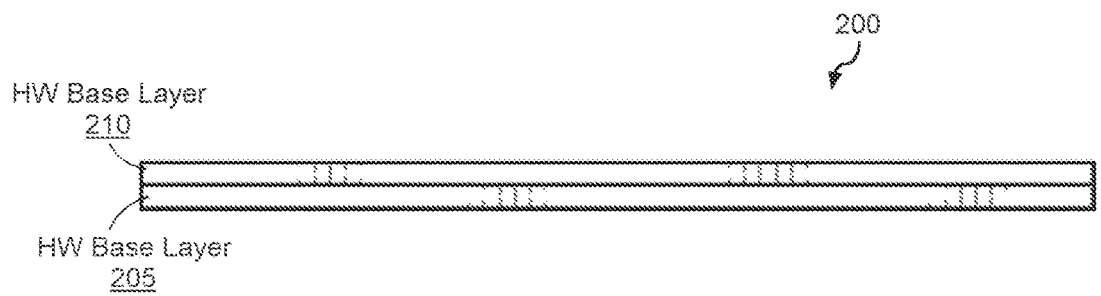
FIGS. 2A-D illustrate diagrams of an example computing architecture for an onboard computing system of a vehicle according to an embodiment hereof.

FIG. 2A illustrates an overview of an operating system of the vehicle computing system 200. The operating system may be a layered operating system. The vehicle computing system 200 may include a hardware layer 205 and a software layer 210. The hardware and software layers 205, 210 may include sub-layers. In some implementations, the operating system of the vehicle computing system 200 may include other layers (e.g., above, below, or in between those shown in FIG. 2A). In an example, the hardware layer 205 and the software layer 210 can be standardized base layers of the vehicle's operating system.

Figure 2B:
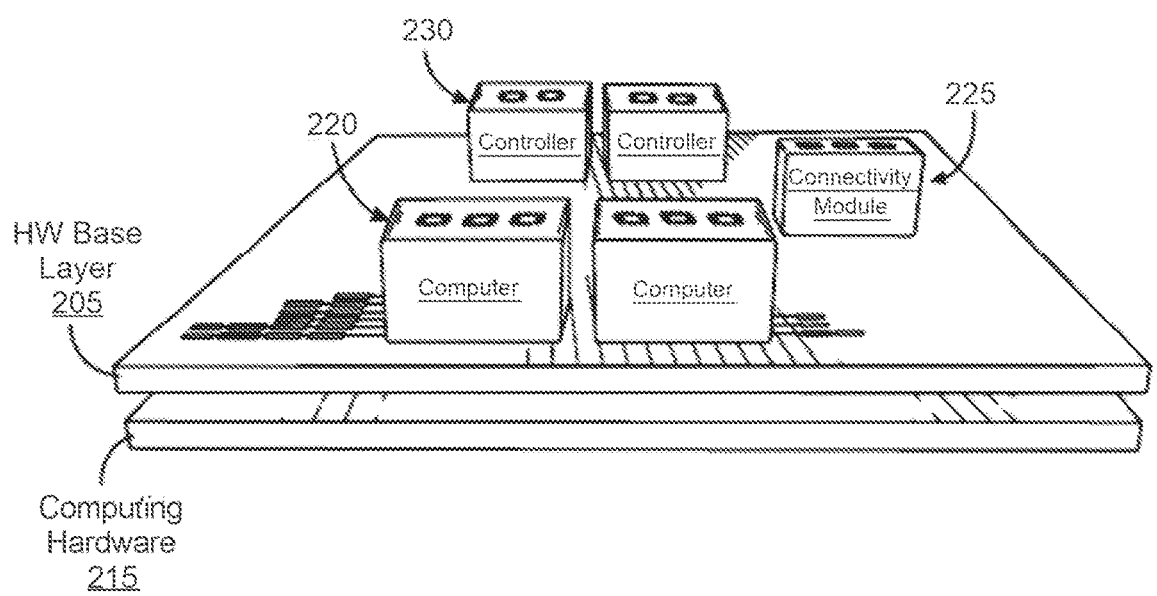

FIG. 2B illustrates a diagram of the hardware layer 205 of the vehicle computing system 200. In the layered operating system of the vehicle computing system 200, the hardware layer 205 can reside between the physical computing hardware 215 onboard the vehicle 105 and the software (e.g., of software layer 210) that runs onboard the vehicle 105.

The hardware layer 205 may be an abstraction layer including computing code that allows for communication between the software and the computing hardware 215 in the vehicle computing system 200. For example, the hardware layer 205 may include interfaces and calls that allow the vehicle computing system 200 to generate a hardware-dependent instruction to the computing hardware 215 (e.g., processors, memories, etc.) of the vehicle 105.

The hardware layer 205 may be configured to help coordinate the hardware resources. The architecture of the hardware layer 205 may be serviced oriented. The services may help provide the computing capabilities of the vehicle computing system 105. For instance, the hardware layer 205 may include the domain computers 220 of the vehicle 105, which may host various functionality of the vehicle 105 such as the vehicle's intelligent functionality. The specification of each domain computer may be tailored to the functions and the performance requirements where the services are abstracted to the domain computers. By way of example, this permits certain processing resources (e.g., graphical processing units) to support the functionality of a central in-vehicle infotainment computer for rendering graphics across one or more display devices for navigation, games, etc. or to support an intelligent automated driving computer to achieve certain industry assurances.

The hardware layer 205 may be configured to include a connectivity module 225 for the vehicle computing system 200. The connectivity module may include code/instructions for interfacing with the communications hardware of the vehicle 105. This can include, for example, interfacing with a communications controller, receiver, transceiver, transmitter, port, conductors, or other hardware for communicating data/information. The connectivity module 225 may allow the vehicle computing system 200 to communicate with other computing systems that are remote from the vehicle 105 including, for example, remote computing platform 110 (e.g., an OEM cloud platform).

The architecture design of the hardware layer 205 may be configured for interfacing with the computing hardware 215 for one or more vehicle control units 225. The vehicle control units 225 may be configured for controlling various functions of the vehicle 105. This may include, for example, a central exterior and interior controller (CEIC), a charging controller, or other controllers as further described herein.

Figure 2C:
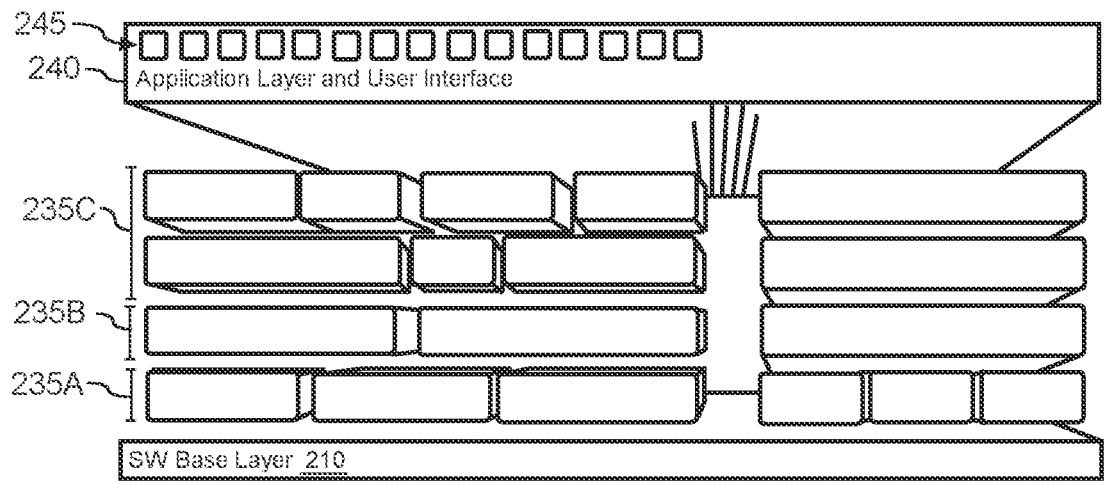

The software layer 205 may be configured to provide software operations for executing various types of functionality and applications of the vehicle 105. FIG. 2C illustrates a diagram of the software layer 210 of the vehicle computing system 200. The architecture of the software layer 210 may be service oriented and may be configured to provide software for various functions of the vehicle computing system 200. To do so, the software layer 210 may include a plurality of sublayers 235A-E. For instance, the software layer 210 may include a first sublayer 235A including firmware (e.g., audio firmware) and a hypervisor, a second sublayer 235B including operating system components (e.g., open-source components), and a third sublayer 235C including middleware (e.g., for flexible integration with applications developed by an associated entity or third-party entity).

The vehicle computing system 200 may include an application layer 240. The application layer 240 may allow for integration with one or more software applications 245 that are downloadable or otherwise accessible by the vehicle 105. The application layer 240 may be configured, for example, using container interfaces to integrate with applications developed by a variety of different entities.

Figure 2D:
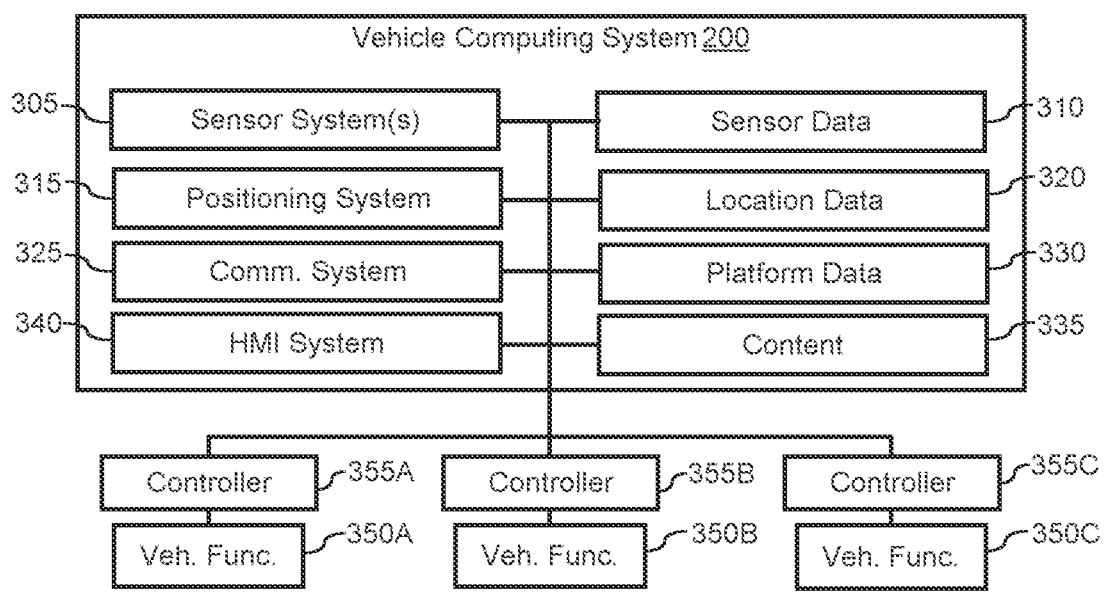

The layered operating system and the vehicle's onboard computing resources may allow the vehicle computing system 200 to collect and communicate data as well as operate the systems implemented onboard the vehicle 105. FIG. 2D illustrates a block diagram of example systems and data of the vehicle 105.

The vehicle 105 may include one or more sensor systems 305. A sensor system may include or otherwise be in communication with a sensor of the vehicle 105 and a module for processing sensor data 310 associated with the sensor configured to acquire the sensor data 305. This may include sensor data 310 associated with the surrounding environment of the vehicle 105, sensor data associated with the interior of the vehicle 105, or sensor data associated with a particular vehicle function. The sensor data 310 may be indicative of conditions observed in the interior of the vehicle, exterior of the vehicle, or in the surrounding environment. For instance, the sensor data 305 may include image data, inside/outside temperature data, weather data, data indicative of a position of a user/object within the vehicle 105, weight data, motion/gesture data, audio data, or other types of data. The sensors may include one or more: cameras (e.g., visible spectrum cameras, infrared cameras), motion sensors, audio sensors (e.g., microphones), weight sensors (e.g., for a vehicle a seat), temperature sensors, humidity sensors, Light Detection and Ranging (LIDAR) systems, Radio Detection and Ranging (RADAR) systems, or other types of sensors. The vehicle 105 may include other sensors configured to acquire data associated with the vehicle 105. For example, the vehicle 105 may include inertial measurement units, wheel odometry devices, or other sensors.

The vehicle 105 may include a positioning system 315. The positioning system 315 may be configured to generate location data 320 (also referred to as position data) indicative of a location (also referred to as a position) of the vehicle 105. For example, the positioning system 315 may determine location by using one or more of inertial sensors (e.g., inertial measurement units, etc.), a satellite positioning system, based on IP address, by using triangulation and/or proximity to network access points or other network components (e.g., cellular towers, Wi-Fi access points, etc.), or other suitable techniques. The positioning system 315 may determine a current location of the vehicle 105. The location may be expressed as a set of coordinates (e.g., latitude, longitude), an address, a semantic location (e.g., "at work"), etc.

In an embodiment, the positioning system 315 may be configured to localize the vehicle 105 within its environment. For example, the vehicle 105 may access map data that provides detailed information about the surrounding environment of the vehicle 105. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), or other traffic signals or control devices/markings (e.g., cross walks)); or any other data. The positioning system 315 may localize the vehicle 105 within the environment (e.g., across multiple axes) based on the map data. For example, the positioning system 155 may process certain sensor data 310 (e.g., LIDAR data, camera data, etc.) to match it to a map of the surrounding environment to get an understanding of the vehicle's position within that environment. The determined position of the vehicle 105 may be used by various systems of the vehicle computing system 200 or another computing system (e.g., the remote computing platform 110, the third-party computing platform 125, the user device 115).

The vehicle 105 may include a communications unit 325 configured to allow the vehicle 105 (and its vehicle computing system 200) to communicate with other computing devices. The vehicle computing system 200 may use the communications unit 325 to communicate with the remote computing platform 110 or one or more other remote computing devices over a network 130 (e.g., via one or more wireless signal connections). For example, the vehicle computing system 200 may utilize the communications unit 325 to receive platform data 330 from the computing platform 110. This may include, for example, an over-the-air (OTA) software update for the operating system of the vehicle computing system 200. Additionally, or alternatively, the vehicle computing system 200 may utilize the communications unit 325 to send vehicle data 335 to the computing platform 110. The vehicle data 335 may include any data acquired onboard the vehicle including, for example, sensor data 310, location data 320, diagnostic data, user input data, data indicative of current software versions or currently running applications, occupancy data, data associated with the user 120 of the vehicle 105, or other types of data obtained (e.g., acquired, accessed, generated, downloaded, etc.) by the vehicle computing system 200.

In some implementations, the communications unit 325 may allow communication among one or more of the systems on-board the vehicle 105. For instance, in some implementations, the communications unit 325 can allow systems on-board the vehicle 105 to communicate with a wheel hub display (not illustrated).

In an embodiment, the communications unit 325 may be configured to allow the vehicle 105 to communicate with or otherwise receive data from the user device 115 (shown in FIG. 1). The communications unit 325 may utilize various communication technologies such as, for example, Bluetooth low energy protocol, radio frequency signaling, or other short range or near filed communication technologies. The communications unit 325 may include any suitable components for interfacing with one or more networks, including, for example, transmitters, receivers, ports, controllers, antennas, or other suitable components that may help facilitate communication.

The vehicle 105 may include one or more human-machine interfaces (HMIs) 340. The human-machine interfaces 340 may include a display device, as described herein. The display device (e.g., touchscreen) may be viewable by a user of the vehicle 105 (e.g., user 120) that is located in the front of the vehicle 105 (e.g., driver's seat, front passenger seat). Additionally, or alternatively, a display device (e.g., rear unit) may be viewable by a user that is located in the rear of the vehicle 105 (e.g., back passenger seats). The human-machine interfaces 340 may present content 335 via a user interface for display to a user 120.

The vehicle 105 may include a plurality of vehicle functions 350A-C. A vehicle function 350A-C may be a functionality that the vehicle 105 is configured to perform based on a detected input. The vehicle functions 350A-C may include one or more: (i) vehicle comfort functions; (ii) vehicle staging functions; (iii) vehicle climate functions; (vi) vehicle navigation functions; (v) drive style functions; (v) vehicle parking functions; or (vi) vehicle entertainment functions. The user 120 may interact with a vehicle function 250A-C through user input (e.g., to an adjustable input device, UI clement) that specifies a setting of the vehicle function 250A-C selected by the user.

Each vehicle function may include a controller 355A-C associated with that particular vehicle function 355A-C. The controller 355A-C for a particular vehicle function may include control circuitry configured to operate its associated vehicle function 355A-C. For example, a controller may include circuitry configured to turn the seat heating function on, to turn the seat heating function off, set a particular temperature or temperature level, etc.

In an embodiment, a controller 355A-C for a particular vehicle function may include or otherwise be associated with a sensor that captures data indicative of the vehicle function being turned on or off, a setting of the vehicle function, etc. For example, a sensor may be an audio sensor or a motion sensor. The audio sensor may be a microphone configured to capture audio input from the user 120. For example, the user 120 may provide a voice command to activate the radio function of the vehicle 105 and request a particular station. The motion sensor may be a visual sensor (e.g., camera), infrared, RADAR, etc. configured to capture a gesture input from the user 120. For example, the user 120 may provide a hand gesture motion to adjust a temperature function of the vehicle 105 to lower the temperature of the vehicle interior.

The controllers 355A-C may be configured to send signals to another onboard system. The signals may encode data associated with a respective vehicle function. The encoded data may indicate, for example, a function setting, timing, etc. In an example, such data may be used to generate content for presentation via the display device 345 (e.g., showing a current setting). Additionally, or alternatively, such data can be included in vehicle data 335 and transmitted to the computing platform 110.

Figure 3:
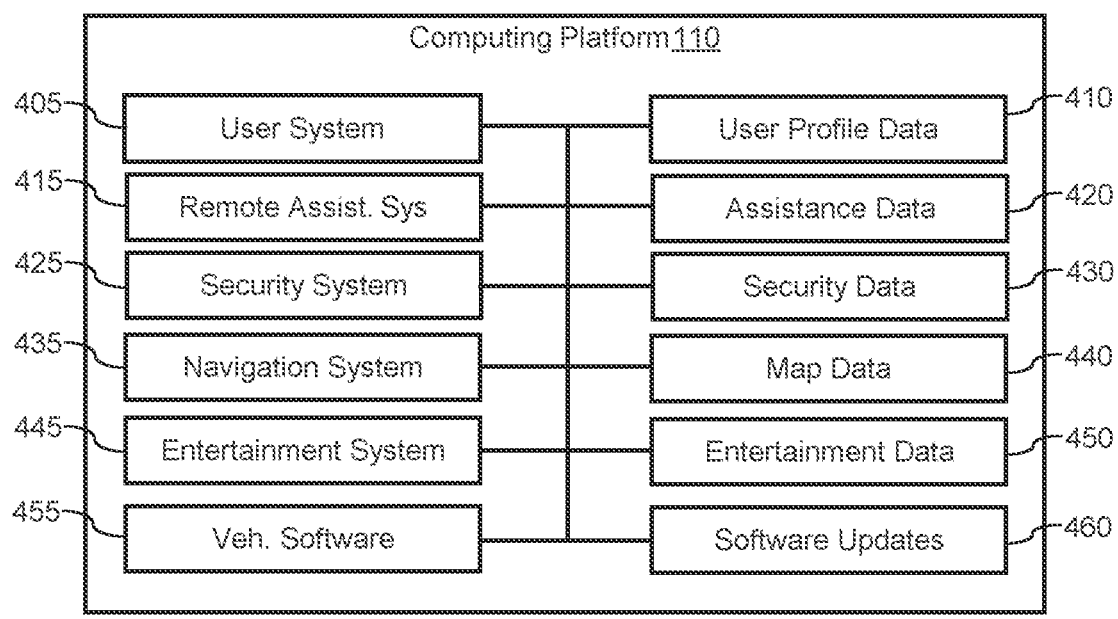
FIG. 3 illustrates a diagram of an example computing platform that is remote from a vehicle according to an embodiment hereof.

FIG. 3 illustrates a diagram of computing platform 110, which is remote from a vehicle according to an embodiment hereof. As described herein, the computing platform 110 may include a cloud-based computing platform. The computing platform 110 may be implemented on one or more servers and include, or otherwise have access to, one or more databases. In an example, the computing platform 110 may be implemented using different servers based on geographic region.

In some implementations, the computing platform 110 may include layered infrastructure that includes a plurality of layers. For instance, the computing platform 110 may include a cloud-based layer associated with functions such as security, automation, monitoring, and resource management. The computing platform 110 may include a cloud application platform layer associated with functions such as charging station functions, live traffic, vehicle functions, vehicle-sharing functions, etc. The computing platform 110 may include applications and services that are built on these layers.

The computing platform 110 may be a modular connected service platform that includes a plurality of services that are available to the vehicle 105. In an example, the computing platform 110 may include a container-based micro-services mesh platform. The services can be represented or implemented as systems within the computing platform 110. The computing platform 110 may also include functions relating to simulation of its components, services, and subsystems. As further described herein, this may be accomplished through the use of a test computing system that is a part of (or at least in communication with) the computing platform 110.

The computing platform 110 may include a user system 405. The user system 405 may create, store, manage, or access user profile data 410. The user profile data 410 may include a plurality of user profiles, each associated with a respective user 120. A user profile may indicate various information about a respective user 120 including the user's preferences (e.g., for music, comfort settings), frequented/past destinations, past routes, etc. The user profiles may be stored in a secure database. In some implementations, when a user 120 enters the vehicle 120, the user's key (or user device) may provide a signal with a user or key identifier to the vehicle 105. The vehicle 105 may transmit data indicative of the identifier (e.g., via its communications system 325) to the computing platform 110. The computing platform 110 may look-up the user profile of the user 120 based on the identifier and transmit user profile data 410 to the vehicle computing system 200 of the vehicle 105. The vehicle computing system 200 may utilize the user profile data 410 to implement preferences of the user 120, present past destination locations, etc. The user profile data 410 may be updated based on information periodically provided by the vehicle 105. In some implementations, the user profile data 410 may be provided to the user device 120.

The computing platform 110 may include a remote assistance system 415. The remote assistance system 415 may provide assistance to the vehicle 105. This can include providing information to the vehicle 105 to assist with charging (e.g., charging locations recommendations), remotely controlling the vehicle (e.g., for AV assistance), roadside assistance (e.g., for collisions, flat tires), etc. The remote assistance system 415 may obtain assistance data 420 to provide its core functions. The assistance data 420 may include information that may be helpful for the remote assistance system 415 to assist the vehicle 105. This may include information related to the vehicle's current state, an occupant's current state, the vehicle's location, the vehicle's route, charge/fuel level, incident data, etc. In some implementations, the assistance data 420 may include the vehicle data 335.

The remote assistance system 415 may transmit data or command signals to provide assistance to the vehicle 105. This may include providing data indicative of relevant charging locations, remote control commands to move the vehicle, connect to an emergency provider, etc.

The computing platform 110 may include a security system 425. The security system 425 can be associated with one or more security-related functions for accessing the computing platform 1110 or the vehicle 105. For instance, the security system 425 can process security data 430 for identifying digital keys, data encryption, data decryption, etc. for accessing the services/systems of the computing platform 110. Additionally, or alternatively, the security system 425 can store security data 430 associated with the vehicle 105. A user 120 can request access to the vehicle 105 (e.g., via the user device 115). In the event the request includes a digital key for the vehicle 105 as indicated in the security data 430, the security system 425 can provide a signal to lock (or unlock) the vehicle 105.

The computing platform 110 may include a navigation system 435 that provides a back-end routing and navigation service for the vehicle 105. The navigation system 435 may provide map data 440 to the vehicle 105. The map data 440 may be utilized by the positioning system 315 of the vehicle 105 to determine a location of the vehicle 105, a point of interest, etc. The navigation system 435 may also provide routes to destinations requested by the vehicle 105 (e.g., via user input to the vehicle's head unit). The routes can be provided as a portion of the map data 440 or as separate routing data. Data provided by the navigation system 435 can be presented as content on the display device 345 of the vehicle 105.

The computing platform 110 may include an entertainment system 445. The entertainment system 445 may access one or more databases for entertainment data 450 for a user 120 of the vehicle 105. In some implementations, the entertainment system 445 may access entertainment data 450 from another computing system (e.g., via an API) associated with a third-party service provider of entertainment content. The entertainment data 450 may include media content such as music, videos, gaming data, etc. The vehicle 105 may output the entertainment data 450 via one or more output devices of the vehicle 105 (e.g., display device, speaker, etc.).

The computing platform 110 may include a vehicle software system 455 that is configured to provide the vehicle 105 with one or more software updates 460. The vehicle software system 455 can include or otherwise communicate with one or more back-end services for providing software updates 460 to vehicles. For example, the vehicle software system 455 (or a service thereof) may maintain or otherwise access a data structure (e.g., list, table) that indicates the current software or versions thereof downloaded to a particular vehicle. The vehicle software system 455 (or a service thereof) may also maintain a data structure indicating software packages or versions that are to be downloaded by the particular vehicle. In some implementations, the vehicle computing system 200 may maintain a data structure that indicates the computing hardware, charging hardware, or other hardware resources onboard a particular vehicle. These data structures can be organized by vehicle identifier (e.g., VIN) such that the computing platform 110 can perform a look-up function, based on the vehicle identifier, to determine the associated software (and updates) for a particular vehicle.

When the vehicle 105 is connected to the computing platform 110 and is available to update its software, the vehicle 105 can request a software update from the computing platform. The computing platform 110 can provide the vehicle 105 one or more software updates 410 as over-the-air (OTA) software updates (also referred to as "OTA updates) via a network 130.

Figure 4:
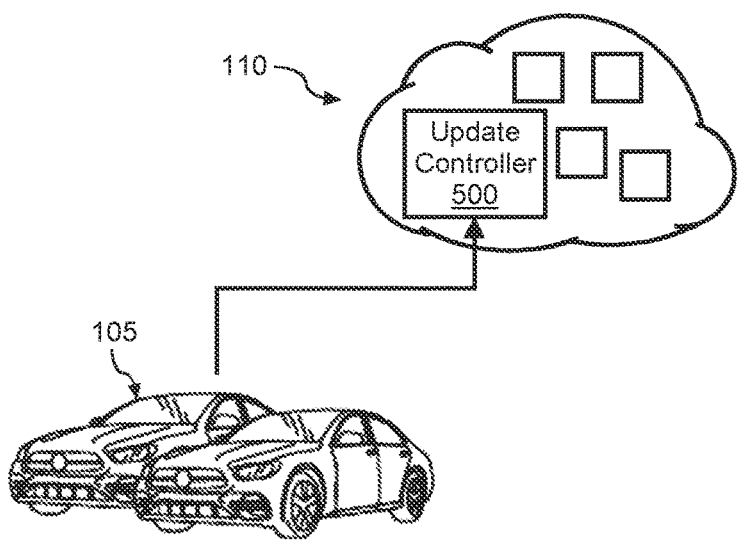
FIG. 4 illustrates a diagram of a computing ecosystem for providing an OTA software update for a vehicle according to an embodiment hereof.

FIG. 4 illustrates a diagram of a computing ecosystem for providing an OTA software update for a vehicle 105 according to an embodiment hereof. FIG. 4 shows a portion of computing platform 110 such as, for example, the vehicle software system 455. To help orchestrate the distribution of software updates 460 (e.g., OTA updates) to vehicles, the computing platform 110 (e.g., the vehicle software system 455) may include a remote update controller system 500. The remote update controller system 500 is also referred to herein as the update controller 500. The update controller 500 may be configured to function as the orchestrator of OTA updates as well as the point of contact for the vehicle 105 when it obtains OTA updates.

Figure 5:
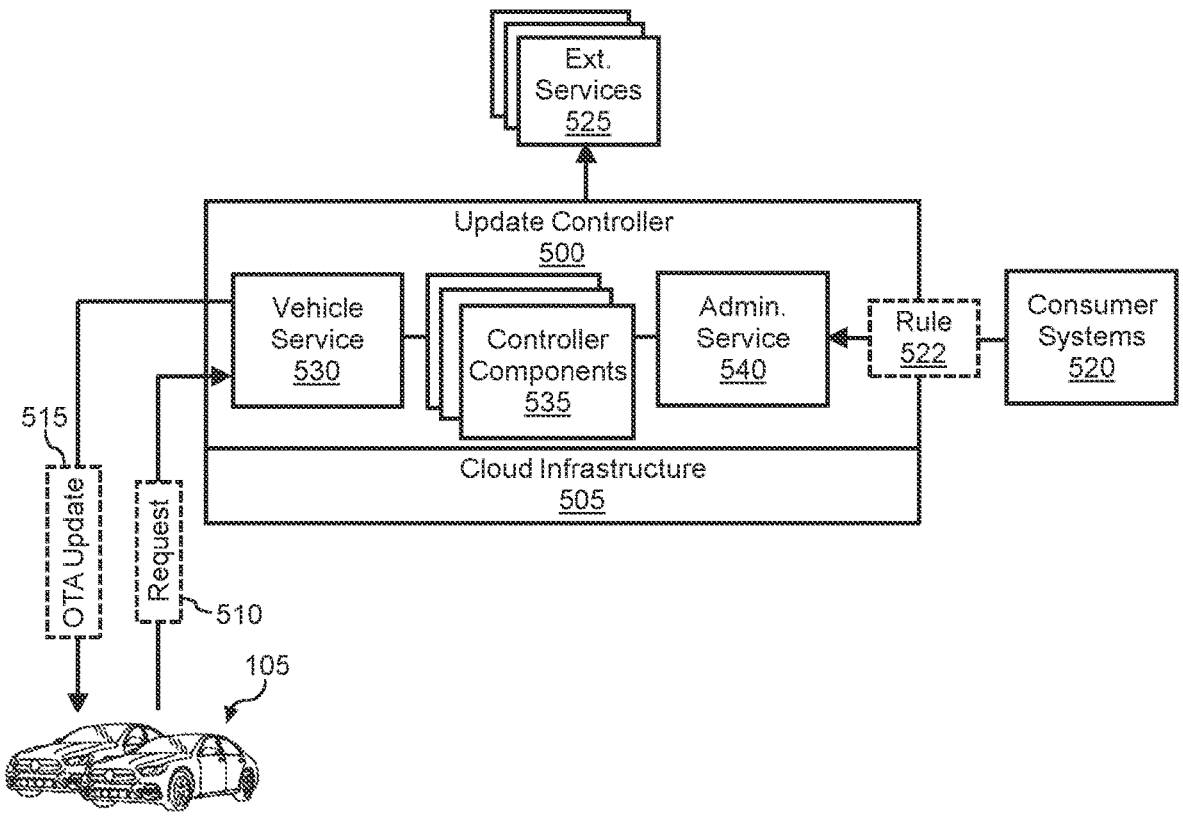
FIG. 5 illustrates a diagram of an example update controller according to an embodiment hereof.

The update controller 500 may include and communicate with various systems/components to coordinate OTA updates. FIG. 5 illustrates a diagram of update controller 500 as well as other systems that the update controller 500 may communicate with to orchestrate the distribution of OTA updates. FIG. 5 may represent the update controller 500 and its ecosystem within an actual, live (real-world) environment for distributing OTA updates to actual vehicles.

The update controller 500 may be implemented on cloud computing infrastructure 505. This may include the infrastructure of the computing platform 100. The cloud computing infrastructure 505 may include the underlying framework and components that enable the delivery of cloud computing services over a network (e.g., the internet). The cloud computing infrastructure 505 may be provided by a cloud computing service provider. The cloud computing service provider may allow entities to access computing resources on-demand, adjust/consume resources as needed, etc. The cloud computing infrastructure 505 may provide the foundation for deploying and running a variety of cloud-based services, including software-as-a-service (SaaS), platform-as-a-service (PaaS), and infrastructure-as-a-service (IaaS).

The cloud computing infrastructure 505 may include hardware, software, networking, and storage resources to support cloud-based applications, data storage, and processing. For instance, the cloud computing infrastructure 505 may include one or more servers. The servers may include physical or virtual machines that host and run applications, store data, and perform computational tasks in the cloud. The servers may be distributed across multiple data centers. The cloud computing infrastructure 505 may be managed and controlled through software platforms that provide functionalities such as resource provisioning, monitoring, security, and automation.

The cloud computing infrastructure 505 may include storage and networking resources. For example, the cloud computing infrastructure 505 may provide various types of storage options, such as object storage, file storage, block storage, etc. These storage resources may be accessible over a network and allow entities to store and retrieve data. The cloud computing infrastructure 505 may include networking components, such as routers, switches, and load balancers, that enable communication between different components of the cloud system. Network connectivity can ensure data transmission and accessibility across distributed servers and data centers.

The cloud computing infrastructure 505 may incorporate various security measures to protect data, applications, and infrastructure from unauthorized access, data breaches, and other threats. This includes encryption, firewalls, access controls, and security monitoring systems.

The cloud computing infrastructure 505 may utilize virtualization technology. The virtualization technology can allow for the creation of virtual instances of servers, operating systems, and other resources. This can help provide efficient resource allocation, scalability, and isolation of different cloud tenants (users or entities) on shared physical infrastructure.

The update controller 500 may communicate with a number of services and systems to manage the distribution of OTA updates. For instance, the update controller 500 may be configured to communicate with the vehicle computing system 200 (not shown in FIG. 5) of vehicle 105. The update controller 500 may receive a request (or other type of communication) generated by the vehicle computing system 500 indicating that the vehicle 105 is available for an OTA update 515. In an example, the vehicle 105 may be considered available for an OTA update 515 in the event that the vehicle 105 has the network connectivity to receive a package/payload associated with the OTA update 515 and/or sufficient computing resources (e.g., processing, memory, power, etc.) needed to download and configure the OTA update 515 on the vehicle 105.

The update controller 500 may communicate with one or more consumer systems 520. The consumer systems 520 may be computing systems configured to create a rule 522 for distributing an OTA update 515.

The rule 522 may, for example, be associated with a campaign for updating certain software versions on a group of vehicles (e.g., certain vehicle models of year X) or a campaign for providing a new software package to a group of vehicles (e.g., a new in-vehicle chatbot for finding music content). The rule 522 may define what vehicles are subject to/applicable for a software update and what OTA update 515 is to be provided to the subject vehicles. For example, a rule 522 may be a combination of characters, text string, etc. that explicitly describes the intention to distribute a given OTA update 515 to a specific set of vehicles.

A "task" can represent the instance of a rule 522 as it applies to a discrete vehicle 105, such that when the vehicle 105 communicates with the update controller 500, the update controller 500 notifies the vehicle 105 of the task and the vehicle computing system 200 executes it. The task can include an action that that vehicle 105 is to take to implement the OTA update 515. This can include, for example, downloading a software update package over a network, updating/changing the configuration of a component of the vehicle 105, etc.

The consumer systems 520 may automatically create a rule 522 or allow for manual creation of a rule 522. For instance, the consumer systems 520 may be configured to automatically create a rule 522 once an OTA update 515 is validated, deployed, posted, or otherwise made available for distribution. Additionally, or alternatively, the consumer systems 520 may include a display device that is configured to present a user interface for a user of the consumer systems 520. The user interface may allow a user to provide user input to create a rule 522.

The update controller 500 may communicate with one or more external software services 525 to facilitate the distribution of an OTA update 515 in accordance with a rule 522. The external software services 525 may also be referred to herein as "dependencies" 525. The external software services 525 may include platform-based systems such as back-end software services (e.g., microservices). The external software services 525 may include services that process or maintain information that can help determine whether a rule 522 applies to a particular vehicle 105 and the actions that are to be taken by the vehicle 105 to implement an OTA update 515 associated with the rule 522. In an example, the dependencies 525 may include a vehicle calling service that maintains/accesses one or more data structures that include vehicle identification number (VINs) for all vehicles. The dependencies 525 may include vehicle configuration service configured to access the vehicle configuration of a respective vehicle as well as external data associated therewith. In another example, the dependences 525 may include a vehicle document (VDOC) service. The VDOC service may include an external vehicle metadata service that maintains a record of the respective current and/or past configurations for each of the respective vehicles as well as any documentation (e.g., required by regulations).

The update controller 500 may include one or more services, components, systems, etc. that are configured to help orchestrate the OTA updates. For instance, the update controller may include a vehicle service 530 that responds to traffic from the vehicle 105. For example, the vehicle service 530 may be configured to receive a request 510 for an OTA update 515 from a vehicle 105. The request 510 may include data that indicates the vehicle 105 is available for an OTA update, if there is one applicable to the vehicle 105. In some implementations, the request 515 may be an explicit request for a particular (or any) OTA updates 515. The vehicle service 530 may be configured to respond to the request 510 with a payload that is indicative of the OTA update 515 as well as the action that the vehicle 105 should take to implement the OTA update 515.

The update controller 500 may include one or more controller components 535. The controller components 535 may be software services configured to map rules and actions to vehicle-specific tasks and carrying out a number of other related responsibilities. For example, the controller components 536 may be configured to communicate with external software services 525 or determine which external software services 525 to communicate with to gather information for a particular OTA update 515. This may help the update controller 500 determine an action for a vehicle 105 to take with respect to a particular OTA update 515. The controller components 535 may include, for example, a rule service (e.g., a microservice for evaluating rules), a service that is response for evaluating vehicle inventory, a device service, a data sync service, etc.

The update controller 500 may include an administration service 540 that is configured to expose an interface for consumer systems 520 to interact with the update controller 500. The administration service 540 may be configured to access data indicative of a rule 522 and interact with the controller components 535 to progress the rule 522 within the ecosystem. For example, the administration service 530 may be configured to coordinate with the rest of the update controller ecosystem such that if the vehicle service 530 were to get a request 510 from a vehicle 105 that is qualified for an OTA update 515, the vehicle service 530 would be able to inform vehicle 105 of the action that needs to be taken for implementation of the OTA update 515.

By way of example, the administration service 540 may obtain a rule 522 for distributing an OTA update 515 such as, "all 2021 models are to upgrade to navigation version 6.1.6." The update controller 500 (e.g., via the controller components 535) may communicate with the external software services 525 from which the update controller 525 can obtain information for a vehicle 105, subject to the rule 522, to properly implement the OTA update 515. The update controller 500 may package the collected information for the subject vehicle 105 and output such information to the vehicle 105 via the vehicle service 530. This may allow vehicle computing system 200 (onboard the vehicle 105) to take the appropriate action to implement the OTA update 515.

The update controller's orchestration across a variety of disparate, heterogenous system can involve a complex computational process. Thus, it may be helpful to test the update controller 500 end to end before updating the live environment where actual consumer systems 520 and vehicles could be adversely affected (e.g., by latency, etc.) due to software issues.

The technology of the present disclosure allows for an efficient and reliable approach to test the update controller 500. To do so, the technology of the present disclosure can test and simulate the function of an update controller and its corresponding ecosystem (e.g., as shown in FIG. 5) within an isolated virtual environment, while still utilizing the applicable cloud computing infrastructure. As further described herein, this can allow tests to be run such that they do not affect actual external dependencies or vehicles.

Figure 6:
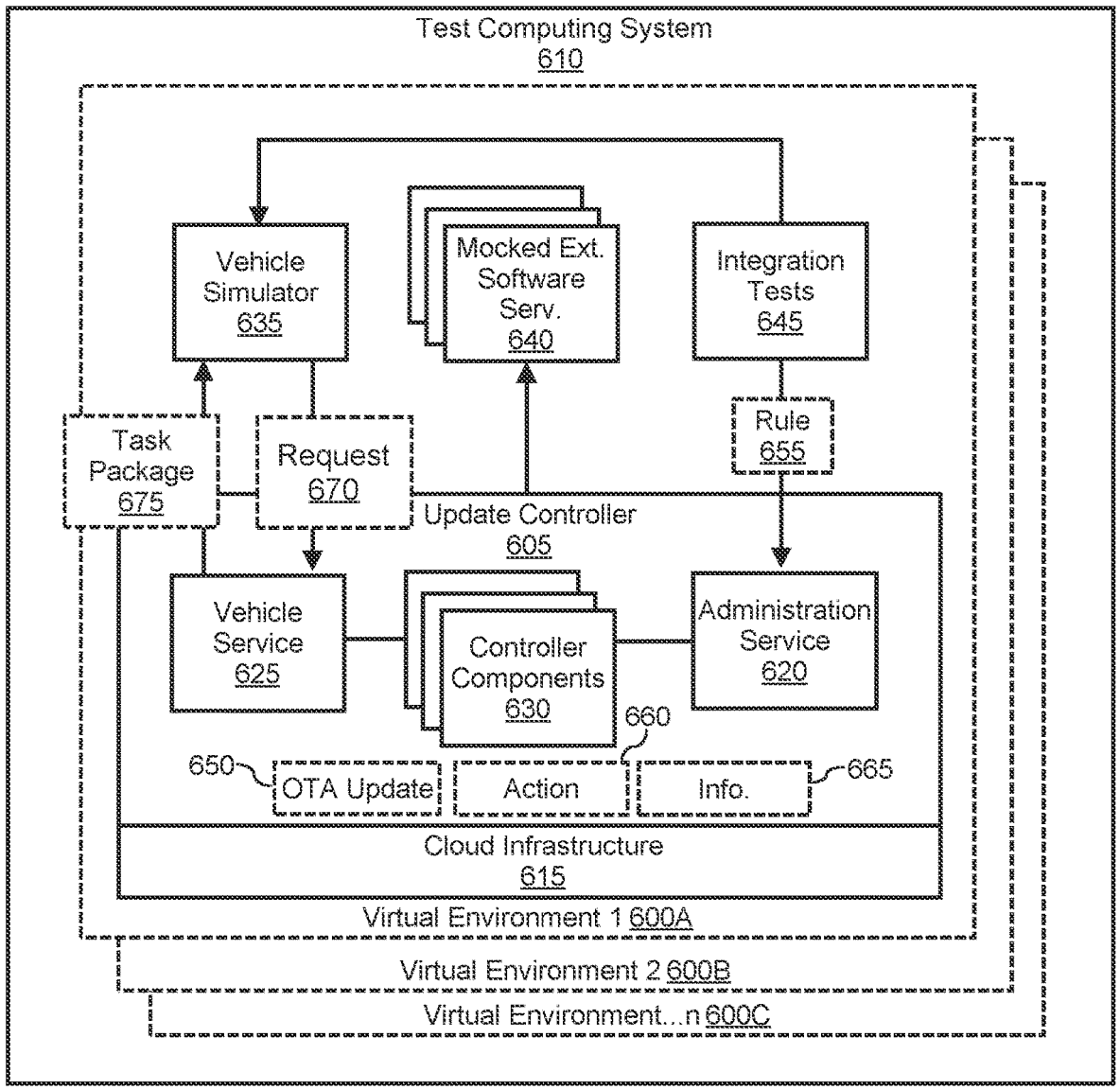
FIG. 6 illustrates a diagram of example virtual environments for testing an update controller according to an embodiment hereof.

FIG. 6 illustrates a diagram of example virtual environments 600A-C for testing an update controller 605 according to an embodiment hereof. A test computing system 610 may be configured to run simulations for testing the update controller 605. As further described herein, the update controller 605 may be a fully, functioning simulated instance of the update controller 500 that includes the services, components, etc. thereof. The test computing system 610 may include a control circuit that is configured to test, within an isolated virtual environment 600A-C, the update controller 605 for distributing an over-the-air (OTA) software update 650. The following describes the components of as well as the operations that can be performed by the test computing system 610 to perform such testing. For example, the control circuit of the test computing system 610 may be configured to perform such operations.

The test computing system 610 may utilize a cloud-based platform infrastructure. For example, the update controller 605 and/or the virtual environments 600A-C may be implemented on cloud computing infrastructure 615. The test computing system 610 may create the virtual environments 600A-C and run the simulation tests of the update controller 605 on the cloud computing infrastructure 615. For example, the test computing system 610 may provision the virtual environments 600A-C for testing the update controller 605, utilizing the cloud computing infrastructure 615. The cloud computing infrastructure 615 may include at least a portion of the components of the cloud computing infrastructure 505, which are utilized in an actual, live environment. In this manner, the testing and simulation of the update controller 605 may be performed on at least some of the same (or similar) hardware, software, networking, storage resources that are used to support the cloud-based applications, data storage, and processing by the computing platform 110 in the real-world environment.

The test computing system 610 may provision one or more virtual environments 600A-C for testing the update controller 605. A virtual environment 600A-C may include a software-based emulation of a physical computing environment. A virtual environment 600A-C may include an isolated and self-contained space within a computing system (e.g., run on the cloud computing infrastructure 615) where applications, software, and mocked dependencies can be installed and run independently of the underlying operating system and other applications (e.g., of the computing platform 110). Thus, the virtual environments 600A-C, and the simulations performed therein, may run on the cloud computing components of the computing platform 110 but be isolated from the real-world environment. This allows tests to be run such that they do not affect actual external dependencies or vehicles (or other endpoint devices).

The test computing system 610 may provision a plurality of virtual environments 600A-C that exist concurrently. Each virtual environment 600A-C may be isolated from one another. They may run separate simulations of the update controller 605. The simulations may run concurrently. For example, the test computing system 610 may provision a first isolated virtual environment 600A. The first isolated virtual environment 600A may include the update controller 605, which may be a simulated instance of the update controller 500. The test computing system 610 may provision a second isolated virtual environment 600B that is separate from the first isolated virtual environment 600A and includes a simulated instance of the update controller separate from the first isolated virtual environment 600A. The test computing system 610 may provision a third virtual environment 600C that is isolated from the first virtual environment 600A and the second virtual environment 600B. The virtual environments 600A-C may exist concurrently, during overlapping timeframes. Each of the virtual environments 600A-C may be removed, torn down, destroyed, etc. separately. Each of the virtual environments 600A-C may be removed, torn down, destroyed, etc. at the same time, during overlapping time frames, or before or after one another.

Provisioning a virtual environment 600A may include the provision of the various elements of the virtual environment 600A for testing the update controller 605. For instance, the testing computing system 605 may provision a virtual environment 600A that includes a simulated instance of the update controller 605. This may include a fully functioning instance of the update controller 500, with dedicated underlying cloud infrastructure components. The simulated instance of the update controller 605 may include a simulated administration service 620 and a simulated vehicle service 625. The simulated administration service 620 may perform the functionality of the administration service 540 within the virtual environment 600A. The simulated vehicle service 625 may perform the functionality of the vehicle service 530 within the virtual environment 600A.

The test computing system 610 may provision, within the isolated virtual environment 600A, a vehicle simulator 635. The vehicle simulator 635 may be a software-based simulator that can represent the vehicle 105 within the virtual environment 600A. The vehicle simulator 635 may include the software and simulate the performance of, at least some, of the operations of the vehicle computing system 200 onboard a vehicle 105.

The test computing system 610 may include one or more integration tests 645. The integration tests may include one or more modules that are configured to act as a simulated consumer service. As further described herein, the integration tests 645 may help set up and run a test using mocked behaviors of external software services/dependencies 525. The integration tests 645 may also coordinate with the vehicle simulator 635 to orchestrate the testing process end to end. For example, integration tests 645 (e.g., the simulated consumer service) may be configured to send a communication to the vehicle simulator 635 to trigger the vehicle simulator 635 to provide data indicating that the vehicle simulator 635 is available for an OTA update 650.

The testing computing system 500 may provision one or more mocked external software services 640 (also referred to herein as "mocked dependencies 640"). The mocked external software services 640 may represent or simulate one or more of the external services 525 that may be called by the update controller in an actual, live environment. Within the virtual environment 600A, however, the behavior of the external services 525 can be mocked with explicit, contrived behaviors ("mocked behaviors"). A mocked behavior may be defined automatically by the modules associated with integration tests 645 based on the performance of live external software services 525. Additionally, or alternatively, a mocked behavior may be defined based on user input via a user interface and stored in the integration tests 645.

Figure 7:
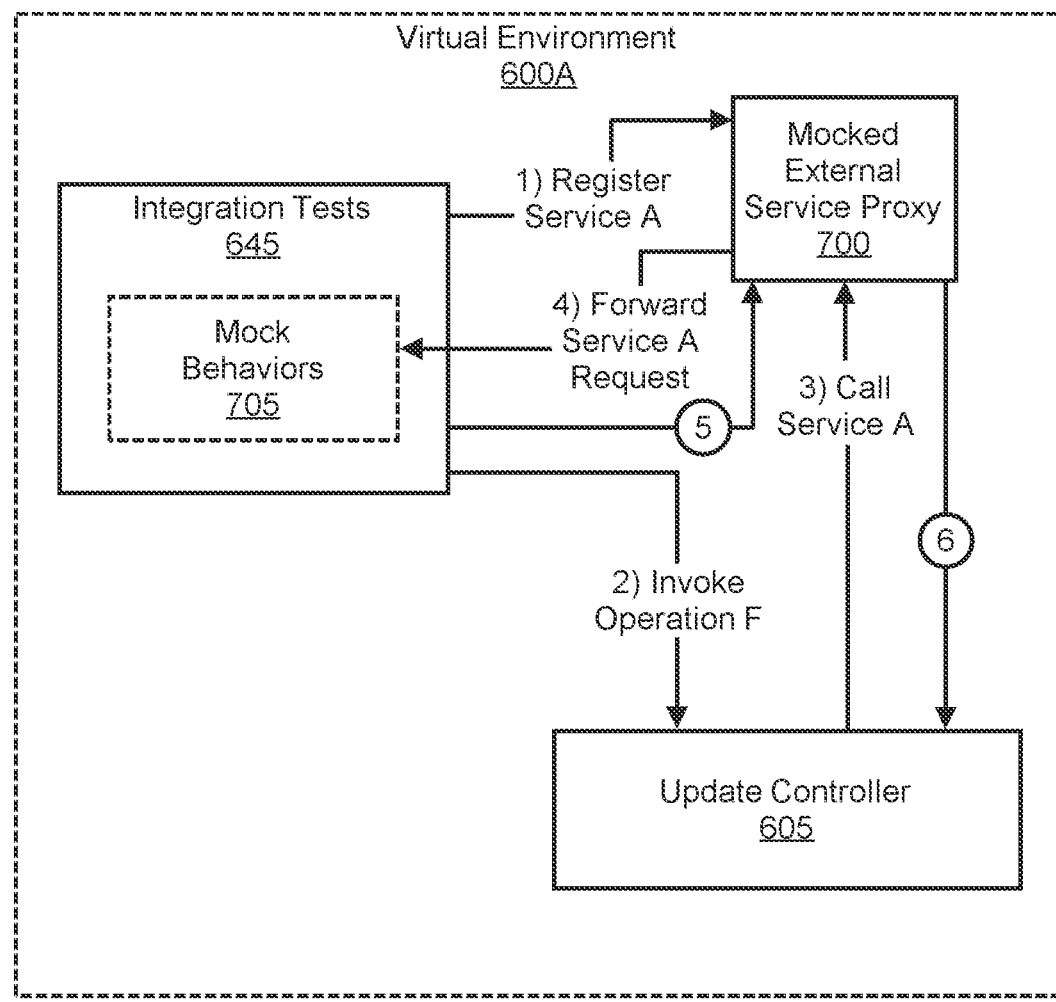
FIG. 7 illustrates a diagram of an example dataflow within an example virtual environment according to an embodiment hereof.

To help facilitate the utilization of the mocked behaviors, the test computing system 605 may include, e.g., within the virtual environment 600A, a proxy for facilitating mocked behaviors of a plurality of external software services. FIG. 7 illustrates a diagram of the first virtual environment 600A with a proxy 700 and an example data flow for facilitating mocked behaviors 705 of one or more mocked external software services 640. The mocked behaviors 705 (e.g., the contrived behaviors within the virtual environment 600A) can be based on the behavior of the corresponding external software services 525 in a live environment, that are now being simulated in the virtual environment 600A.

To implement the mocked behaviors 705 within the virtual environment 600A, a proxy 700 may be included within the virtual environment 600A. For instance, instead of deploying individual mocked instances of all the mocked external software services 640 (mocked external dependencies), a single proxy 700 may be used within the virtual environment 600A for all mocked external software services 640. From the update controller's perspective, the update controller 605 may only be aware that it is calling a particular service with a given request, and expecting a response in a given schema. The update controller 605 may not know how the call is routed to a particular service or what system/service is actually responding.

In the virtual environment 600A, the integration tests 645 may set up the mock behaviors 705 to exercise a given set of test cases. The integration tests 645 may define one or more mocked behaviors 705 of one or more mocked external software services 640 using a full-featured mocking framework. This approach can keep the definition of expected behavior of the mocked external software services 640 localized to the tests that are triggering it. After defining the mocked behaviors 705, the integration tests 645 may register the mocked behaviors 705 with the proxy 700. The mocked behaviors 705 may be registered with the proxy 700 prior to running a simulation test of the update controller 605. In this way, during a simulation run, all requests for a given mocked external software service 640 may be forwarded back to a listener in the integration tests 645 that execute a mocked behavior 700 of the mocked external software service 640.

By way of example, the integration tests 645 may define a mocked behavior 700 for a mocked external software service A ("service A"). Service A may represent, for example, a mocked instance of a vehicle configuration service. The integration tests 645 may define a mocked behavior 700 that should be performed in the event the update controller 605 calls service A. The integration tests 645 may register the mocked behaviors 705 of service A with the proxy 700.

The integration tests 645 may communicate with the update controller 605 to invoke an operation "F". Operation F may represent a rule activation process. For instance, the operation F may include an instruction to activate a rule 655 (shown in FIG. 6) such that it would be progressed through the update controller 605 and translated into one or more actions 660 (shown in FIG. 6) that can be provided to the vehicle simulator 635. Within the virtual environment 600A, the update controller 605 may "call service A," by accessing the proxy 700 in response to the operation F. The call may be forwarded by the proxy 700 back to a listener in the integration tests 645 that executes the mocked behavior 700 of service A. The mocked behavior 700 may define that certain information from service A (e.g., vehicle configuration data) should be provided in response to the request of the update controller 605. Thus, the integration tests 645 may return such information to the proxy 700, which may then provide the information to the update controller 605.

As described herein, a mocked behavior 700 simulates a response of an external software service 525 (e.g., in a live environment) to a request from the update controller 605 within the isolated virtual environment 600A. To do so, the mocked behavior 700 may be developed based on the historical performance of the external software service 525 that it is intended to mock. This can allow the mocked behaviors 700 to be defined based on real data, accumulated in an actual, live environment.

Figure 8:
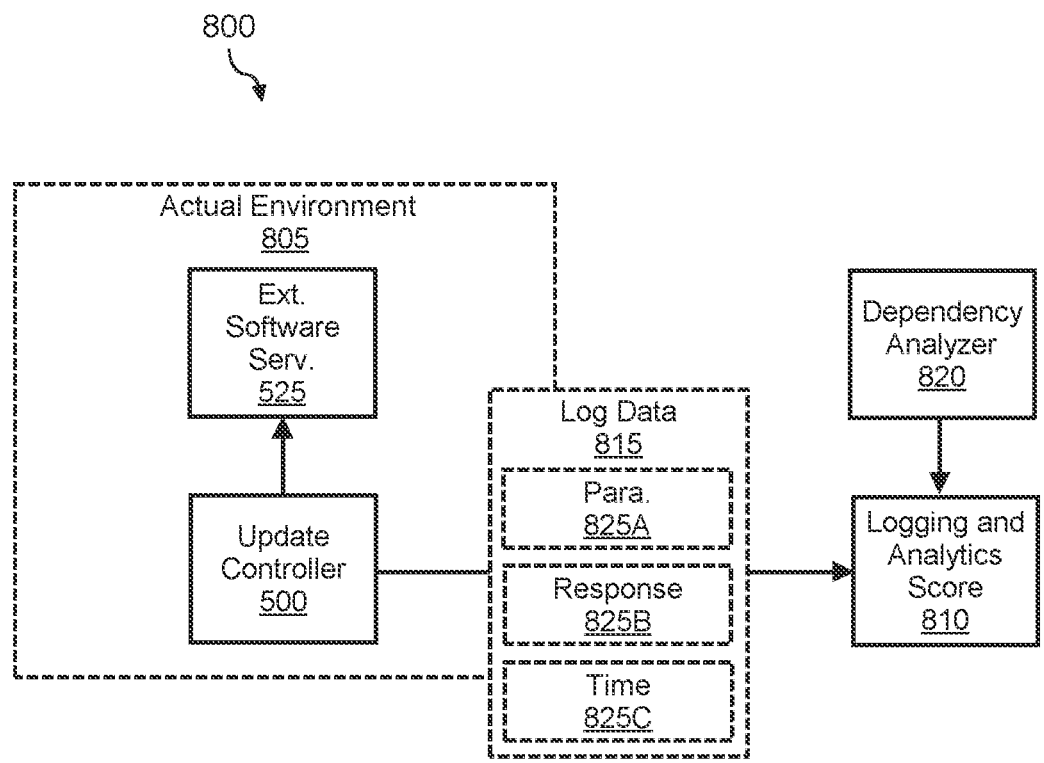
FIG. 8 illustrates a diagram of an example system and dataflow for generating mocked behaviors according to embodiment hereof.

FIG. 8 illustrates a diagram of an example system 800 and dataflow for generating mocked behaviors 700 according to embodiment hereof. The system 800 may include the update controller 500 and the external software services 525 that operate within an actual environment 805 (e.g., a non-virtual, real-world environment). The system 800 may include a logging and analytics store 810 that is configured to store log data 815 that is acquired by the update controller 500 and make such data accessible for analytics. The system 800 may include a dependency analyzer 820 that is configured to generate a model of the behaviors of an external software service 525 when it interacts with the update controller 500 in the actual environment 805. Such information may be provided to the modules of the integration tests 645 (or another system) to compute the mocked behaviors 700 for use in a virtual environment 600A. In this way, the mocked behaviors 700 may be based on the log data 815 generated during communication between the update controller 500 and the external software service 525 in the actual computing environment 805.

By way of example, in the actual environment 805, the update controller 500 may log metadata/information every time it calls an external software service 525 (dependency 525). This may include calling an external service A. The information logged by the update controller 500 may include log data 815. The log data 815 may include one or more request parameters 825A associated with the update controller 500. The request parameters 825A may be indicative of the contents of the request made by the update controller 500 when calling the external service A. This may include the types of information requested by the update controller 500. The log data 815 may include a response payload 825B provided by the external software service 525. The response payload 825B may be indicative of the information provided by the external service A in response to the request communicated by the update controller 500. In some implementations, the log data 815 may include a response time 825C indicating a duration of time until the external software service 525 responded to the update controller 500. The log data 815 may include other selected metadata (e.g., the associated external service A, etc.).

The log data 815 may be provided to the logging and analytics store 810. The logging and analytics store 810 may store the log data 815 in a data structure in a manner that indicates it is associated with the external software service 525 (e.g., external service A).

The log data 815 may be processed to determine a predicted behavior of its associated external software service 525. The log data 815 may be processed by the dependency analyzer 820. In an example, the dependency analyzer 820 may be configured to build a model of service A's behavior based on the log data 815 and a service behavior model.

In some implementations, the service behavior model may include a rules-based model that weighs the log data 815 to, for example, determine a pattern of responses and response times from external service A. The rules-based model may include a set of pre-defined rules or heuristics that may be processed to achieve objectives (e.g., for applying weights for setting analysis and selection).

In some implementations, the service behavior model may include one or more machine-learned models. The machine-learned models may include unsupervised learning models. In an embodiment, the machine-learned models may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

The service behavior model may be a predictive model that is trained to predict the behavior of an external software service 525. By way of example, service behavior model may be a machine-learned modal that is trained on training data indicative of past requests by the update controller 500 and the responses of the external service A. In some implementations, the training data may be indicative of the response time of the external service A. The training data may include labelled log data 815 associated with the external service A.

The machine-learned model may be trained utilized an objective function, such as a loss function. For example, using the labelled training data, the model can be trained to minimize a loss function based on a comparison of the predicted response of a dependency to a ground truth representative of the real-world response of the dependency. The model can be re-trained and parameters re-weighted until a threshold level of prediction accuracy has been reached.

The service behavior model may be configured to generate an output indicative of a predicted behavior of an external service 525. The output may, for instance, describe the information predicted to be provided by external service A in response to a request from the update controller 500. In an example, predictions of service A's behavior can indicate that when the input is "x" the response is likely to be "y" or when the input size is greater than 20 KB, the response latency is usually 100 ms. The dependency analyzer 820 may utilize the service behavior model and these output predicted behaviors to generate a model of the behavior of service A.

The mocked behaviors 700 may be based on the predicted behavior of the external software service 525. For example, the modules of the integration tests 645 in a virtual environment may use the model of a service's behavior to generate and define the mocked behaviors 700. This may be utilized in addition to, or instead of, explicit mocking. This approach may be helpful for certain "real world" tests such as load tests.

In some implementations, the model-based behavior may be expressed in terms of mocks. This may help avoid additional adjustments in the manner of executing tests in a virtual environment 600A.

Over time, there may be changed or new behaviors of the external software service 525. Additionally, or alternatively, new external software services may be provided to the ecosystem for access in the actual environment 805. The framework and process described with respect to FIG. 8, may be one example approach for accounting for such changes in behavior or added services by logging data indicative of the newer behaviors and/or new external services. In a manner similar to that described herein, such log data can be utilized to generate mocked behaviors, which can allow these new behaviors/services to be accounted for when simulating the performance of an update controller.

Returning to FIG. 6, the virtual environment 600A may be considered, for example, "zero-click" because it designed to be dynamically provisioned, tested, and removed (e.g., torn down, deleted, etc.) through automated CI/CD pipelines.

One or more CI/CD pipelines may be used to help achieve the zero-click aspect of the virtual environments 600A-C. For example, a provision virtual environment pipeline may contain the automation to create the cloud computing infrastructure 615 using an Infrastructure as Code (IaC) framework, deploy an instance of the update controller 605, set up the proxy 700 used to mock external software services 640, deploy an instance of the vehicle simulator 635, and deploy the integration tests 645. In some implementations, the provision virtual environment pipeline may be extended to dynamically generate mocks based on the dependency analyzer's models and inject them into the integration tests 645. An execute virtual environment tests pipeline may run one or more integration tests 645 deployed to a given virtual environment 600A-C and report the results. A destroy virtual environment pipeline may remove/tear down everything that was provisioned for a given virtual environment 600A-C. In some implementations, the pipelines may be invoked from other pipelines that are triggered by certain actions such as a commit to a source code branch.

Figure 9:
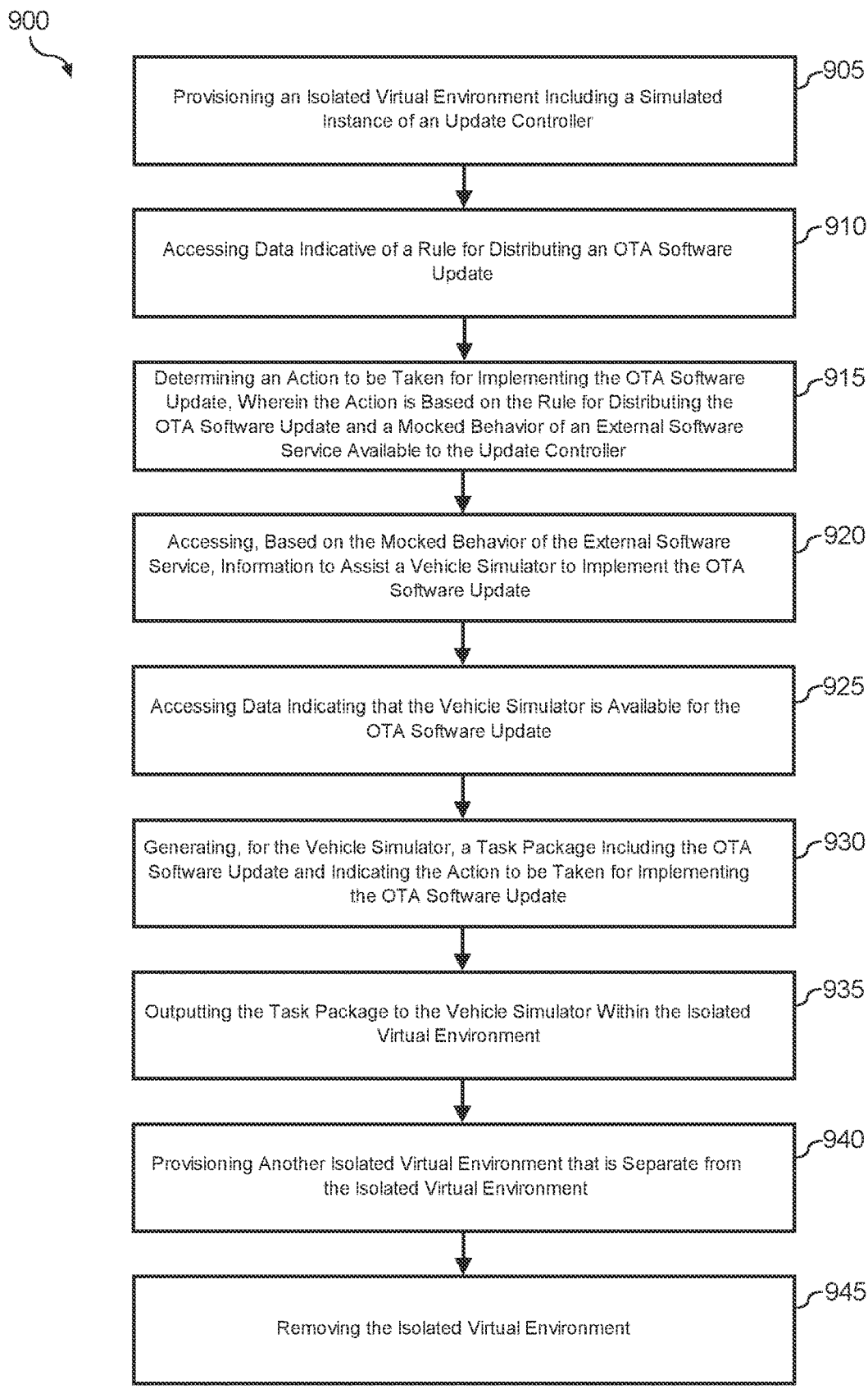
FIG. 9 illustrates a flowchart diagram of an example method according to an embodiment hereof.

FIG. 9 illustrates a flowchart diagram of an example method 900 for simulating an update controller according to an embodiment hereof. The method 900 may include an end to end testing process using the elements of the virtual environment 600A in FIG. 6. The method may be performed by a computing system described with reference to the other figures (e.g., test computing system 610). In an embodiment, method 900 may be performed by a control circuit of a computing system. One or more portions of the method may be implemented as an algorithm on the hardware components of the devices described herein. For example, the steps of method may be implemented as operations/instructions that are executable by computing hardware.

FIG. 9 illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure.

FIG. 9 is described with reference to elements/terms described with respect to other systems and figures (e.g., FIG. 6), for example illustrated purposes and is not meant to be limiting. One or more portions of the method may be performed additionally, or alternatively, by other systems.

In an embodiment, the method 900 may begin with or otherwise include an operation 905, in which a computing system provisions an isolated virtual environment including a simulated instance of an update controller. For instance, the test computing system 610 can provision a first virtual environment 600A that includes an update controller 605, which is a simulated instance of the update controller 500 (e.g., used in an actual, real-world environment). As described herein, the update controller 605 may include a simulated administration service 620 and a simulated vehicle service 625. Within the first virtual environment 600A, the testing computing system 610 can provision a vehicle simulator 635, a simulated consumer service (e.g., represented by integration tests 645), and a proxy 700 for facilitating mocked behaviors 705 of a plurality of external software services.

The method 900 in an embodiment may include an operation 910, in which the computing system accesses data indicative of a rule for distributing an OTA software update. For instance, the simulated administration service 620, of the test computing system 610, may access data indicative of a rule 655 for distributing the OTA update 650. The rule 655 for distributing the OTA update 650 may be provided by the simulated consumer service (e.g., the integration tests 645). By way of example, for a test simulation run, the rule 655 may include an instruction that "all 2021 models are to upgrade to infotainment platform version 1.6."

The method 900 in an embodiment may include an operation 915, in which the computing system determines an action to be taken for implementing the OTA software update. For instance, the test computing system 610 may determine an action 660 to be taken for implementing the OTA update 650. The action 660 may include the action that a vehicle simulator 635 is to take to properly implement the OTA update 650.

The action 660 may be based on the rule 655 for distributing the OTA update 650 and a mocked behavior 705 of an external software service available to the update controller 605. For example, the update controller 650 may process the rule 655 and call one or more mocked external software services 640 within the virtual environment 600A to access information 665 that may help implement the OTA update 650. This may include calling the mocked external software services 640 (e.g., mocked dependencies 640) that represent a service an update controller 500 may call in an actual, live environment. The response of the mocked external software services 640 may include a mocked behavior 700 (e.g., simulating a response of a corresponding external software service 525) to a request from the update controller 640 within the isolated virtual environment 600A.

By way of example, in response to the rule "all 2021 models are to upgrade to infotainment platform version 1.6," the update controller 640 (e.g., its simulated controller components 630) may call a vehicle calling service to obtain VINs for 2021 models. Additionally, the new infotainment software vehicle may operate differently depending on whether a vehicle is equipped with ambient lighting. When this software is delivered, it may be accompanied with the correct configuration regarding this ambient lighting feature to allow for the proper implementation of the corresponding OTA update 625. Thus, the update controller 605 may call a mocked vehicle configuration service to obtain this configuration information based on the VINs for the 2021 models.

As described herein, within the first virtual environment 600A, the call can be directed to a proxy 700 where mocked behaviors 700 for these services are registered. Through the proxy 700, the calls may be directed to the integration tests 645, which have defined the mocked behaviors 700 for responding to the update controller's requests.

The method 900 in an embodiment may include an operation 920, in which the computing system accesses, based on the mocked behavior of the external software service, information to assist the vehicle simulator to implement the OTA software update. For instance, based on the mocked behavior 700, the integration tests 645 may provide the update controller 605 with the requested VINs (e.g., a list of fake VINs) and vehicle configuration data for the ambient lighting features. The update controller 605 may access this information 665 to assist the vehicle simulator 635 to implement the OTA update 650 (e.g., the upgrade to infotainment platform version 1.6).

The method 900 in an embodiment may include an operation 925, in which the computing system accesses data indicating that a vehicle simulator is available for the OTA software update. For instance, the test computing system 610 (e.g., the update controller 605) may access data indicating that a vehicle simulator 635 is available for the OTA update 650. To do so, the integration tests 645 may send a communication to the vehicle simulator 635 to trigger the vehicle simulator 635 to provide data indicating that the vehicle simulator 635 is available for the OTA update 650. In an example, this data may be formatted as a request 670 for any available updates that may be applicable to the vehicle simulator 635. The vehicle simulator 635 may provide an identifier such as, for example, a VIN associated with the vehicle simulator 635. This may be a fake VIN that matches an entry in the list of fake VINs acquired by the update controller 605 based on the mocked behaviors 700 of the mocked dependencies 640.

The method 900 in an embodiment may include an operation 930, in which the computing system generates, for the vehicle simulator, a task package comprising the OTA software update and indicating the action to be taken for implementing the OTA software update. For instance, the test computing system 610 may generate, for the vehicle simulator 635, a task package 675 including the OTA update 650 and indicating the action 660 to be taken for implementing the OTA update 650. By way of example, the update controller 605 may generate the task package 675 that includes the upgrade to infotainment platform version 1.6 or a reference, pointer, link, address, etc. thereto. The task package 675 may also indicate the action 660 to be taken by the vehicle simulator 635 including, for example, implementation instructions or instructions for services to contact.

The task package 675 may include the information 665 to assist the vehicle simulator 635 to implement the OTA update 650. For example, the task package 675 may include the vehicle configuration data for the ambient lighting features to properly implement the infotainment software upgrade for that particular vehicle simulator 635.

The method 900 in an embodiment may include an operation 935, in which the computing system outputs the task package to the vehicle simulator within the isolated virtual environment. For instance, the test computing system 610 (e.g., the update controller 605) may output the task package 675 to the vehicle simulator 635 within the isolated virtual environment 600A.

The performance of the update controller 605 may be evaluated based on the end to end process. For instance, the performance of the update controller 605 (and its ability to handle the new OTA update 650) can be measured by analyzing the update controller's ability to: process the rule 655, call the appropriate mocked external software services 640, identify the action 660 to be taken by the vehicle simulator 635, process the request 670 from the vehicle simulator 635, generate the task package 675, and/or deliver the task package 675 to the vehicle simulator 635. Each operation can be measured in terms of efficiency (e.g., timing, latency, etc.) and accuracy (e.g., did the task package 675 include the appropriate information). The higher the efficiency and accuracy, the better the performance of the update controller 605. Additionally, or alternatively, the performance of the update controller 605 can be measured by an error metric. The error metric may be indicative of a frequency, type, or severity of the errors encountered during the end to end simulation run in the virtual environment 600A. The higher the error metric (e.g., due to higher frequency, repeated error type, higher severity), the lower the performance of the update controller 605. In some implementations, a validation state may be reached once the performance of the update controller 605 reaches a certain performance threshold.

The method 900 in an embodiment may include an operation 940, in which the computing system provisions another isolated virtual environment that is separate from the isolated virtual environment. For instance, as described herein, the isolated virtual environment (e.g., used in the previously described test for the new infotainment software version 1.6) may be a first isolated virtual environment 600A. The test computing system 610 may provision a second isolated virtual environment 600B that is separate from the first isolated virtual environment 600A. This may allow the test computing system 610 to run a separate isolated simulation on another simulated instance of the update controller 500 for a different rule, OTA update, etc. or to run concurrent simulations for a plurality of results with respect to the same test.

The method 900 in an embodiment may include an operation 945, in which the computing system removes an isolated virtual environment. This may include destroying, tearing down, deleting, etc. the first isolated virtual environment 600A after, for example, one or more tests are performed, a performance threshold is reached, or a validation state is achieved. The second isolated virtual environment 600B may remain even after the first isolated virtual environment 600A is destroyed.

Figure 10:
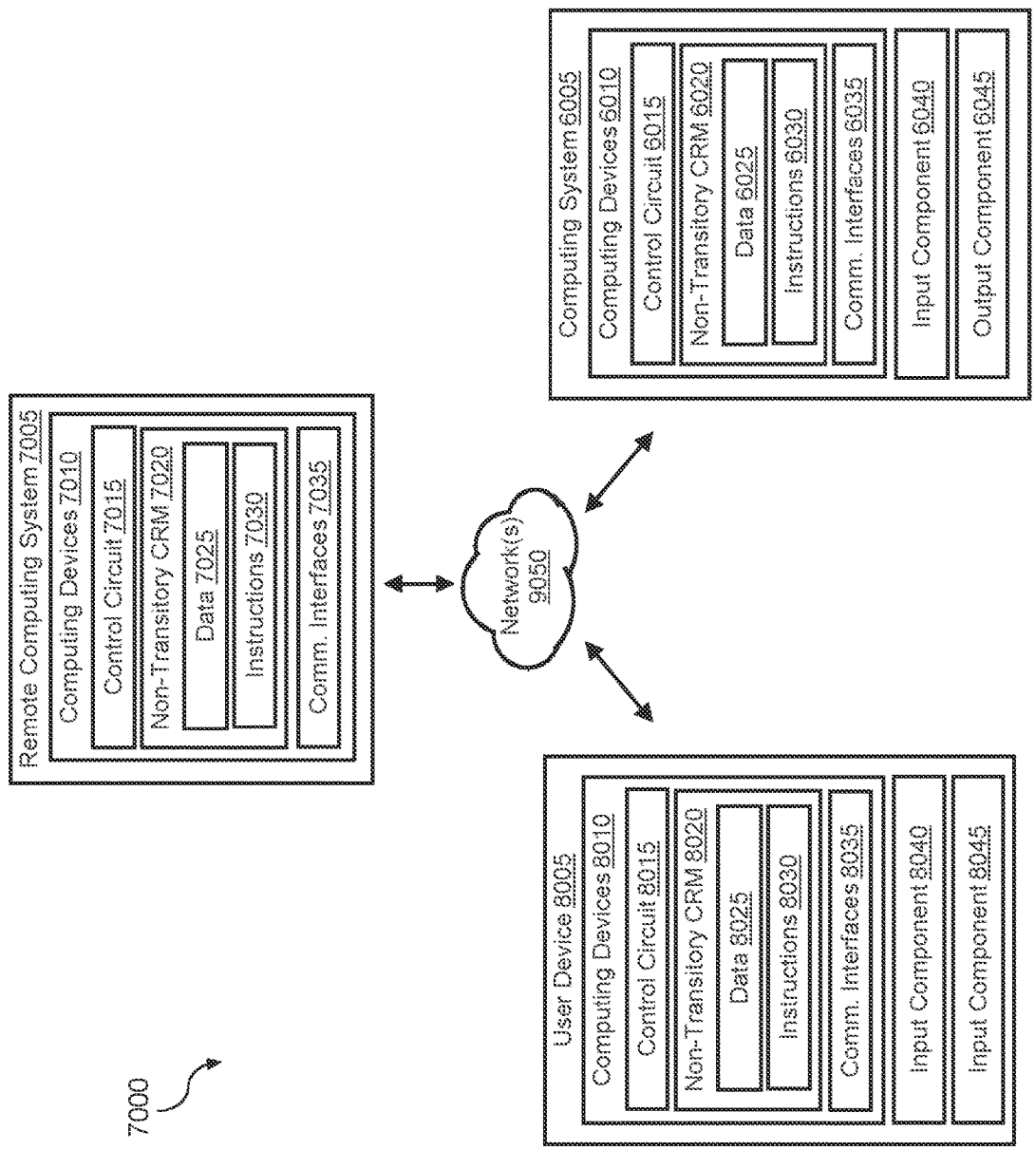
FIG. 10 illustrates a diagram of an example computing ecosystem with computing components according to an embodiment hereof.

FIG. 10 illustrates a block diagram of an example computing system 7000 according to an embodiment hereof. The system 7000 includes a computing system 6005 (e.g., a computing system onboard a vehicle), a remote computing system 7005 (e.g., a server computing system, a cloud computing platform, a testing computing system, etc. that is remote from the vehicle), and a user device 8005 (e.g., user device of a vehicle user) that are communicatively coupled over one or more networks 9050. The computing system 6005, remote computing system 7005, user device 8005, and networks 9050 may represent the systems (and the components of those systems) and networks described herein with reference to other figures.

The computing system 6005 may include one or more computing devices 6010 or circuitry. For instance, the computing system 6005 may include a control circuit 6015 and a non-transitory computer-readable medium 6020, also referred to herein as memory. In an embodiment, the control circuit 6015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 6015 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 6015 may be programmed by one or more computer-readable or computer-executable instructions stored on the non-transitory computer-readable medium 6020.

In an embodiment, the non-transitory computer-readable medium 6020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 6020 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 6020 may store information that may be accessed by the control circuit 6015. For instance, the non-transitory computer-readable medium 6020 (e.g., memory devices) may store data 6025 that may be obtained, received, accessed, written, manipulated, created, and/or stored. The data 6025 may include, for instance, any of the data or information described herein. In some implementations, the computing system 6005 may obtain data from one or more memories that are remote from the computing system 6005.

The non-transitory computer-readable medium 6020 may also store computer-readable instructions 6030 that may be executed by the control circuit 6015. The instructions 6030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 6015 to perform one or more functional tasks. The modules and computer-readable/executable instructions may be described as performing various operations or tasks when the control circuit 6015 or other hardware component is executing the modules or computer-readable instructions.

The instructions 6030 may be executed in logically and/or virtually separate threads on the control circuit 6015. For example, the non-transitory computer-readable medium 6020 may store instructions 6030 that when executed by the control circuit 6015 cause the control circuit 6015 to perform any of the operations, methods and/or processes described herein. In some cases, the non-transitory computer-readable medium 620 may store computer-executable instructions or computer-readable instructions, such as instructions to perform at least a portion of the method of FIG. 9.

The computing system 6005 may include one or more communication interfaces 6035. The communication interfaces 6035 may be used to communicate with one or more other systems. The communication interfaces 6035 may include any circuits, components, software, etc. for communicating via one or more networks (e.g., networks 750). In some implementations, the communication interfaces 6035 may include for example, one or more of a communications controller, receiver, transceiver, transmitter, port, conductors, software and/or hardware for communicating data/information.

The computing system 6005 may also include one or more user input components 6040 that receives user input. For example, the user input component 6040 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 6005 may include one or more output components 6045. The output components 6045 may include hardware and/or software for audibly or visually producing content. For instance, the output components 6045 may include one or more speakers, earpieces, headsets, handsets, etc. The output components 6045 may include a display device, which may include hardware for displaying a user interface and/or messages for a user. By way of example, the output component 6045 may include a display screen, Cathode Ray Tube (CRT), Liquid Crystal Display (LCD), plasma screen, touch screen, Television (TV), projector, tablet, and/or other suitable display components.

The remote computing system 7005 may include one or more computing devices 710. In an embodiment, the remote computing system 7005 may include or is otherwise implemented by one or more server computing devices. In instances in which the remote computing system 7005 includes plural server computing devices, such server computing devices may operate according to sequential computing architectures, parallel computing architectures, or some combination thereof.

The remote computing system 7005 may include a control circuit 7015 and a non-transitory computer-readable medium 7020, also referred to herein as memory 7020. In an embodiment, the control circuit 7015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 7015 may be programmed by one or more computer-readable or computer-executable instructions stored on the non-transitory computer-readable medium 7020.

In an embodiment, the non-transitory computer-readable medium 7020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), or a digital versatile disk (DVD), and/or a memory stick.

The non-transitory computer-readable medium 7020 may store information that may be accessed by the control circuit 7015. For instance, the non-transitory computer-readable medium 7020 (e.g., memory devices) may store data 7025 that may be obtained, received, accessed, written, manipulated, created, and/or stored. The data 7025 may include, for instance, any of the data or information described herein. In some implementations, the remote computing system 7005 may obtain data from one or more memories that are remote from the remote computing system 7005.

The non-transitory computer-readable medium 7020 may also store computer-readable instructions 7030 that may be executed by the control circuit 7015. The instructions 7030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 7015 to perform one or more functional tasks. The modules and computer-readable/executable instructions may be described as performing various operations or tasks when the control circuit 7015 or other hardware component is executing the modules or computer-readable instructions.

The instructions 7030 may be executed in logically and/or virtually separate threads on the control circuit 7015. For example, the non-transitory computer-readable medium 7020 may store instructions 7030 that when executed by the control circuit 7015 cause the control circuit 7015 to perform any of the operations, methods and/or processes described herein. This may include the operations described as being performed by the test computing system 610. In some cases, the non-transitory computer-readable medium 7020 may store computer-executable instructions or computer-readable instructions, such as instructions to perform at least a portion of the dataflows and methods/processes of FIGS. 5-9.

The server computing system 7005 may include one or more communication interfaces 7035. The communication interfaces 7035 may be used to communicate with one or more other systems. The communication interfaces 7035 may include any circuits, components, software, etc. for communicating via one or more networks (e.g., networks 9050). In some implementations, the communication interfaces 7035 may include for example, one or more of a communications controller, receiver, transceiver, transmitter, port, conductors, software and/or hardware for communicating data/information.

The computing system 6005 and/or the server computing system 7005 may also be in communication with a user device 8005 that is communicatively coupled over the networks 9050.

The user device 8005 may include one or more computing devices 8010. The user device 8005 may include a control circuit 8015 and a non-transitory computer-readable medium 8020, also referred to herein as memory 8020. In an embodiment, the control circuit 8015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 8015 may be programmed by one or more computer-readable or computer-executable instructions stored on the non-transitory computer-readable medium 8020.

In an embodiment, the non-transitory computer-readable medium 8020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 8020 may store information that may be accessed by the control circuit 8015. For instance, the non-transitory computer-readable medium 820 (e.g., memory devices) may store data 8025 that may be obtained, received, accessed, written, manipulated, created, and/or stored. The data 8025 may include, for instance, any of the data or information described herein. In some implementations, the user device 8005 may obtain data from one or more memories that are remote from the user device 8005.

The non-transitory computer-readable medium 8020 may also store computer-readable instructions 8030 that may be executed by the control circuit 8015. The instructions 8030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 8015 to perform one or more functional tasks. The modules and computer-readable/executable instructions may be described as performing various operations or tasks when the control circuit 8015 or other hardware component is executing the modules or computer-readable instructions.

The instructions 8030 may be executed in logically or virtually separate threads on the control circuit 8015. For example, the non-transitory computer-readable medium 8020 may store instructions 8030 that when executed by the control circuit 8015 cause the control circuit 8015 to perform any of the operations, methods and/or processes described herein. In some cases, the non-transitory computer-readable medium 8020 may store computer-executable instructions or computer-readable instructions, such as instructions to perform at least a portion of the method of FIG. 9.

The user device 8005 may include one or more communication interfaces 8035. The communication interfaces 8035 may be used to communicate with one or more other systems. The communication interfaces 8035 may include any circuits, components, software, etc. for communicating via one or more networks (e.g., networks 9050). In some implementations, the communication interfaces 8035 may include for example, one or more of a communications controller, receiver, transceiver, transmitter, port, conductors, software and/or hardware for communicating data/information.

The user device 8005 may also include one or more user input components 840 that receives user input. For example, the user input component 8040 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The user device 8005 may include one or more output components 8045. The output components 8045 may include hardware and/or software for audibly or visually producing content. For instance, the output components 8045 may include one or more speakers, earpieces, headsets, handsets, etc. The output components 8045 may include a display device, which may include hardware for displaying a user interface and/or messages for a user. By way of example, the output component 8045 may include a display screen, CRT, LCD, plasma screen, touch screen, TV, projector, tablet, and/or other suitable display components.

The one or more networks 9050 may be any type of communications network, such as a local area network (e.g., intranet), wide area network (e.g., Internet), or some combination thereof and may include any number of wired or wireless links. In general, communication over a network 9050 may be carried via any type of wired and/or wireless connection, using a wide variety of communication protocols (e.g., Transmission Control Protocol/Internet Protocol (TCP/IP), Hypertext Transfer Protocol (HTTP), Simple Mail Transfer Protocol (SMTP), File Transfer Protocol (FTP)), encodings or formats (e.g., Hyper Text Markup Language (HTML), extensible markup language (XML)), and/or protection schemes (e.g., virtual private network (VPN), secure HTTP, Secure Sockets Layer (SSL)).

Additional Discussion of Various Embodiments

Embodiment 1 relates to a computing system. The computing system includes a control circuit configured to test, within an isolated virtual environment, an update controller for distributing an over-the-air (OTA) software update. The control circuit is configured to access data indicative of a rule for distributing the OTA software update. The control circuit is configured to determine an action to be taken for implementing the OTA software update. The action is based on the rule for distributing the OTA software update and a mocked behavior of an external software service available to the update controller. The mocked behavior simulates a response of the external software service to a request from the update controller within the isolated virtual environment. The control circuit is configured to access data indicating that a vehicle simulator is available for the OTA software update. The control circuit is configured to generate, for the vehicle simulator, a task package including the OTA software update and indicating the action to be taken for implementing the OTA software update. The control circuit is configured to output the task package to the vehicle simulator within the isolated virtual environment.

Embodiment 2 includes the computing system of Embodiment 1. In this embodiment, the control circuit is further configured to provision the isolated virtual environment including a simulated instance of the update controller, wherein the simulated instance of the update controller includes a simulated administration service and a simulated vehicle service.

Embodiment 3 includes the computing system of any preceding embodiment. In this embodiment, to provision the isolated virtual environment, the control circuit is configured to provision, within the isolated virtual environment, the vehicle simulator, a simulated consumer service, and a proxy for facilitating mocked behaviors of a plurality of external software services.

Embodiment 4 includes the computing system of any preceding embodiment. In this embodiment, the rule for distributing the OTA software update is provided by the simulated consumer service.

Embodiment 5 includes the computing system of any preceding embodiment. In this embodiment, the simulated consumer service is configured to send a communication to the vehicle simulator to trigger the vehicle simulator to provide the data indicating that the vehicle simulator is available for the OTA software update.

Embodiment 6 includes the computing system of any preceding embodiment. In this embodiment, the mocked behaviors are registered with the proxy prior to running a simulation test of the update controller.

Embodiment 7 includes the computing system of any preceding embodiment. In this embodiment, the mocked behavior is based on a behavior of the external software service in a live environment.

Embodiment 8 includes the computing system of any preceding embodiment. In this embodiment, the mocked behavior is based on log data generated during communication between the update controller and the external software service in the live computing environment. The log data includes a request parameter associated with the update controller, a response payload provided by the external software service, and a response time indicating a duration of time until the external software service responded to the update controller.

Embodiment 9 includes the computing system of any preceding embodiment. In this embodiment, the log data is processed to determine a predicted behavior of the external software service. The mocked behavior is based on the predicted behavior of the external software service.

Embodiment 10 includes the computing system of any preceding embodiment. In this embodiment, the control circuit is further configured to access, based on the mocked behavior of the external software service, information to assist the vehicle simulator to implement the OTA software update. The task package includes the information to assist the vehicle simulator to implement the OTA software update.

Embodiment 11 includes the computing system of any preceding embodiment. In this embodiment, the external software service is a vehicle configuration service and the information to assist the vehicle simulator to implement the OTA software update includes vehicle configuration data for a vehicle component associated with the OTA software update.

Embodiment 12 includes the computing system of any preceding embodiment. In this embodiment, the control circuit utilizes cloud-based computing platform infrastructure.

Embodiment 13 includes the computing system of any preceding embodiment. In this embodiment, the isolated virtual environment is a first isolated virtual environment, and the control circuit is configured to provision a second isolated virtual environment that is separate from the first isolated virtual environment and includes a simulated instance of the update controller separate from the first isolated virtual environment.

Embodiment 14 includes the computing system of any preceding embodiment. In this embodiment, the control circuit is further configured to remove the isolated virtual environment.

Embodiment 15 relates to a computer-implemented method for testing, within an isolated virtual environment, an update controller for distributing an over-the-air (OTA) software update. In this embodiment, the method includes accessing data indicative of a rule for distributing the OTA software update. The method includes determining an action to be taken for implementing the OTA software update. The action is based on the rule for distributing the OTA software update and a mocked behavior of an external software service available to the update controller. The mocked behavior simulates a response of the external software service to a request from the update controller within the isolated virtual environment. The method includes accessing data indicating that a vehicle simulator is available for the OTA software update. The method includes generating, for the vehicle simulator, a task package including the OTA software update and indicating the action to be taken for implementing the OTA software update. The method includes outputting the task package to the vehicle simulator within the isolated virtual environment.

Embodiment 16 includes the method of embodiment 14. In this embodiment, the method further includes provisioning the isolated virtual environment including a simulated instance of the update controller.

Embodiment 17 includes the method of any previous embodiment. In this embodiment, the method includes accessing, based on the mocked behavior of the external software service, information to assist the vehicle simulator to implement the OTA software update. The task package includes the information to assist the vehicle simulator to implement the OTA software update.

Embodiment 18 includes the method of any previous embodiment. In this embodiment, the isolated virtual environment is a first isolated virtual environment, and the method further includes provisioning a second isolated virtual environment that is separate from the first isolated virtual environment.

Embodiment 19 includes the method of any previous embodiment. In this embodiment, the method further includes removing the isolated virtual environment.

Embodiment 20 relates to one or more non-transitory computer-readable media that store instructions that are executable by a control circuit configured to test, within an isolated virtual environment, an update controller for distributing an over-the-air (OTA) software update. In this embodiment, the control circuit is configured to access data indicative of a rule for distributing the OTA software update. The control circuit is configured to determine an action to be taken for implementing the OTA software update. The action is based on the rule for distributing the OTA software update and a mocked behavior of an external software service available to the update controller. The mocked behavior simulates a response of the external software service to a request from the update controller within the isolated virtual environment. The control circuit is configured to access data indicating that a vehicle simulator is available for the OTA software update. The control circuit is configured to generate, for the vehicle simulator, a task package including the OTA software update and indicating the action to be taken for implementing the OTA software update. The control circuit is configured to output the task package to the vehicle simulator within the isolated virtual environment.

Additional Disclosure

As used herein, adjectives and their possessive forms are intended to be used interchangeably unless apparent otherwise from the context and/or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

Computing tasks and operations discussed herein as being performed at or by computing device(s) remote from the vehicle can instead be performed at the vehicle (e.g., via the vehicle computing system), or vice versa.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment may be used with another embodiment to yield a still further embodiment. Thus, it is intended that the present disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c) . . . (i), (ii), (iii), . . . , etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

What is claimed is:

1. A computing system comprising:
a control circuit configured to test, within an isolated virtual environment, an update controller for distributing an over-the-air (OTA) software update, the control circuit configured to:
access data indicative of a rule for distributing the OTA software update;
determine an action to be taken for implementing the OTA software update, wherein the action is based on the rule for distributing the OTA software update and a mocked behavior of an external software service available to the update controller,
wherein the mocked behavior simulates a response of the external software service to a request from the update controller within the isolated virtual environment;
access data indicating that a vehicle simulator is available for the OTA software update;
generate, for the vehicle simulator, a software update task package comprising the OTA software update and indicating the action to be taken for implementing the OTA software update; and
output the software update task package to the vehicle simulator within the isolated virtual environment.

2. The computing system of claim 1, wherein the control circuit is further configured to:
provision the isolated virtual environment comprising a simulated instance of the update controller, wherein the simulated instance of the update controller comprises a simulated administration service and a simulated vehicle service.

3. The computing system of claim 2, wherein to provision the isolated virtual environment, the control circuit is configured to:
provision, within the isolated virtual environment, the vehicle simulator, a simulated consumer service, and a proxy for facilitating mocked behaviors of a plurality of external software services.

4. The computing system of claim 3, wherein the rule for distributing the OTA software update is provided by the simulated consumer service.

5. The computing system of claim 3, wherein the simulated consumer service is configured to send a communication to the vehicle simulator to trigger the vehicle simulator to provide the data indicating that the vehicle simulator is available for the OTA software update.

6. The computing system of claim 3, wherein the mocked behaviors are registered with the proxy prior to running a simulation test of the update controller.

7. The computing system of claim 1, wherein the mocked behavior is based on a behavior of the external software service in a live environment.

8. The computing system of claim 7, wherein the mocked behavior is based on log data generated during communication between the update controller and the external software service in the live computing environment, wherein the log data comprises a request parameter associated with the update controller, a response payload provided by the external software service, and a response time indicating a duration of time until the external software service responded to the update controller.

9. The computing system of claim 8, wherein the log data is processed to determine a predicted behavior of the external software service, and wherein the mocked behavior is based on the predicted behavior of the external software service.

10. The computing system of claim 1, wherein the control circuit is further configured to:
access, based on the mocked behavior of the external software service, information to assist the vehicle simulator to implement the OTA software update,
wherein the software update task package comprises the information to assist the vehicle simulator to implement the OTA software update.

11. The computing system of claim 10, wherein the external software service is a vehicle configuration service and wherein the information to assist the vehicle simulator to implement the OTA software update comprises vehicle configuration data for a vehicle component associated with the OTA software update.

12. The computing system of claim 1, wherein the control circuit utilizes cloud-based computing platform infrastructure.

13. The computing system of claim 1, wherein the isolated virtual environment is a first isolated virtual environment, and wherein the control circuit is configured to provision a second isolated virtual environment that is separate from the first isolated virtual environment and comprises a simulated instance of the update controller separate from the first isolated virtual environment.

14. The computing system of claim 1, wherein the control circuit is further configured to remove the isolated virtual environment.

15. A computer-implemented method for testing, within an isolated virtual environment, an update controller for distributing an over-the-air (OTA) software update, the method comprising:
accessing data indicative of a rule for distributing the OTA software update;
determining an action to be taken for implementing the OTA software update, wherein the action is based on the rule for distributing the OTA software update and a mocked behavior of an external software service available to the update controller,
wherein the mocked behavior simulates a response of the external software service to a request from the update controller within the isolated virtual environment;
accessing data indicating that a vehicle simulator is available for the OTA software update;
generating, for the vehicle simulator, a software update task package comprising the OTA software update and indicating the action to be taken for implementing the OTA software update; and
outputting the software update task package to the vehicle simulator within the isolated virtual environment.

16. The computer-implemented method of claim 15, further comprising:
provisioning the isolated virtual environment comprising a simulated instance of the update controller.

17. The computer-implemented method of claim 15, further comprising:
accessing, based on the mocked behavior of the external software service, information to assist the vehicle simulator to implement the OTA software update,
wherein the software update task package comprises the information to assist the vehicle simulator to implement the OTA software update.

18. The computer-implemented method of claim 15, wherein the isolated virtual environment is a first isolated virtual environment, and wherein the method further comprises:
- provisioning a second isolated virtual environment that is separate from the first isolated virtual environment.

19. The computer-implemented method of claim 15, further comprising:
- removing the isolated virtual environment.

20. One or more non-transitory computer-readable media that store instructions that are executable by a control circuit configured to test, within an isolated virtual environment, an update controller for distributing an over-the-air (OTA) software update, the control circuit configured to:
- access data indicative of a rule for distributing the OTA software update;
- determine an action to be taken for implementing the OTA software update, wherein the action is based on the rule for distributing the OTA software update and a mocked behavior of an external software service available to the update controller,
- wherein the mocked behavior simulates a response of the external software service to a request from the update controller within the isolated virtual environment;
- access data indicating that a vehicle simulator is available for the OTA software update;
- generate, for the vehicle simulator, a software update task package comprising the OTA software update and indicating the action to be taken for implementing the OTA software update; and
- output the software update task package to the vehicle simulator within the isolated virtual environment.

* * * * *